(12) United States Patent
Hadad

(10) Patent No.: US 7,133,352 B1
(45) Date of Patent: Nov. 7, 2006

(54) BI-DIRECTIONAL COMMUNICATION CHANNEL

(76) Inventor: Zion Hadad, 48 Haalmogim St., Rishon Lezion (IL)

( * ) Notice: Subject to any disclaimer, the term of this patent is extended or adjusted under 35 U.S.C. 154(b) by 0 days.

(21) Appl. No.: 09/399,109

(22) Filed: Sep. 20, 1999

(51) Int. Cl.
*H04J 11/00* (2006.01)

(52) U.S. Cl. .................................. 370/208

(58) Field of Classification Search ............ 370/208, 370/209, 210, 281, 310.1, 329, 335, 342, 370/343, 344, 441, 479; 455/65, 506
See application file for complete search history.

(56) References Cited

U.S. PATENT DOCUMENTS

| | | | | |
|---|---|---|---|---|
| 5,504,775 A | * | 4/1996 | Chouly et al. | 375/205 |
| 5,726,978 A | * | 3/1998 | Frodigh et al. | 370/252 |
| 5,790,516 A | * | 8/1998 | Gudmundson et al. | 370/210 |
| 5,933,421 A | * | 8/1999 | Alamouti et al. | 370/330 |
| 5,953,311 A | * | 9/1999 | Davies et al. | 370/210 |
| 5,995,483 A | * | 11/1999 | Marchok et al. | 370/207 |
| 6,088,398 A | * | 7/2000 | Wahlqvist et al. | 375/260 |
| 6,188,717 B1 | * | 2/2001 | Kaiser et al. | 375/148 |
| 6,381,236 B1 | * | 4/2002 | Miyashita et al. | 370/343 |

* cited by examiner

*Primary Examiner*—Huy D. Vu
*Assistant Examiner*—Duc Duong

(57) ABSTRACT

A communication system using OFDM transmission from a base station to subscriber units, includes means for achieving a bi-directional channel. These means comprise transmitting means in the subscriber units for the transmission of signal synchronous with the guard time interval in the OFDM transmission, and receiving means in the base station for the reception of the transmitted signals. The system also includes signal shaping means in the receiver of the base station and/or the subscriber unit for the application of a window in time to signals received therein. A communication system includes a combination of CDMA modulation codes and OFDM coding/decoding means to achieve orthogonality between signals from the various users in the uplink. A communication system includes a combination of OFDM and channeling means for achieving orthogonality between signals from the various users in the uplink. Automatic Frequency Control is achieved with means in the mobile unit for achieving a frequency-lock to the base station.

6 Claims, 20 Drawing Sheets

Prior Art

BI-DIRECTIONAL COMMUNICATION CHANNEL

CROSS-REFERENCE TO RELATED APPLICATIONS

The present application is related to the application No. 129186 filed on Mar. 25, 1999 in Israel and entitled "Bi-Directional Communication Channel".

STATEMENT AS TO RIGHTS TO INVENTIONS MADE UNDER FEDERALLY SPONSORED R&D

There was no Federal sponsoring for the present invention, therefore there are no rights deriving therefrom.

FIELD OF THE INVENTION

This invention relates to video, voice and data transmission in wireless or cable communications, and more particularly to improvements in links between base stations and subscriber units.

BACKGROUND OF THE INVENTION

Heretofore, Advanced communications today use the Orthogonal Frequency Division Multiplex (OFDM) modulation for efficient transmission of digital signals. These signals may include video, voice and/or data.

OFDM is a commonly used implementation of Multi-Carrier Modulation (MCM).

The Orthogonal Frequency Division Multiplex (OFDM) is a modern advanced modulation method, that achieves better use of the frequency spectrum, as detailed below.

OFDM has been used in recent years in many applications where robustness against severe multipath and interference conditions is required, together with high system capacity, flexibility in providing variable bit rate services, scalability and a capability to perform well in Single Frequency Networks (SNF). OFDM forms the basis for various communication standards, including for example the Digital Terrestrial Television Broadcasting, Digital Audio Broadcasting (DAB), wireless LANs and Wireless Local Loops.

A particular example of the use of OFDM is in DVB systems.

Digital video broadcasting (DVB) systems are now being developed, based on several standards, in Europe, U.S.A. and Japan. Each standard addresses cable broadcasting as well as satellite and terrestrial/area broadcasting.

In Europe, various standards define the digital video broadcasting (DVB) system, including DVB-T (DVB-Terrestrial), DVB-C (DVB-Cable) and DVB-S (DVB-Satellite).

For example, the European standard EN 300 744 defines the DVB-T.

The OFDM modulation method has been chosen, for example, for the digital television broadcasting (MPEG-2) per standard DVB-T.

A disadvantage of presently used DVB-T systems is their unidirectional operation. That is, information is only transmitted from a base station (the transmitter) to subscribers (the receivers). A system may contain many base stations and subscribers, however there is always an unidirectional flow of information.

An interactive system can be achieved by using a telephone line as a return channel from the set top box, however this method is slow and inconvenient.

A fast, flexible link from subscriber to the base station is required for the multitude of advanced services that are in demand today.

To achieve a bi-directional link is a difficult task, that requires an innovative approach as detailed below. The problem is further aggravated by the requirement that the solution should cause no deterioration in performance; moreover, updated subscriber units capable of bi-directional operation should coexist with older subscriber units that do not have these transmission capabilities.

To understand the difficulty of complying with these requirements, one should delve into the intricacies of contemporary digital video broadcasting standards. These standards specify advanced signal processing, to achieve higher quality communications at very high bit rates.

Thus, in the Orthogonal Frequency Division Multiplex (OFDM) modulation method, a block of information is divided among N frequency channels, so that a portion of the information is transmitted in each of the abovementioned channels or frequencies. Since each channel is orthogonal to the others, a better utilization of the frequency spectrum is achieved.

The OFDM method achieves lower Inter-Symbol Interference ISI, since the distribution of the information over N carriers allows each bit of information to be sent for a longer time period (N times longer). For a low ISI, the overlap between adjacent symbols should be lower than 10%. The ISI increases as the percentage of overlap between adjacent symbols increases. In OFDM, since each symbol is N times longer, the percent overlap between adjacent symbols decreases, hence the Inter-Symbol Interference ISI is lower.

Still better spectrum utilization is achieved by QAM (Quadrature Amplitude Modulation) on each of the N carriers.

An IFFT (Inverse Fourier Transform) is performed on the modulated carriers, to form the signal in the time domain that corresponds to the above modulated carriers. The signal is transmitted as a frame that contains the block of information to be transmitted.

A possible problem with the above modulation method is multipath, that may result in interference between adjacent transmitted frames. To address this problem, a guard time period is inserted between adjacent frames. The guard time is especially important in QAM, that is more sensitive to interference. In DVB-T systems, the guard time is chosen as either $1/4$, $1/8$, $1/16$ or $1/32$ of the symbol time.

A disadvantage of presently used OFDM channels is the need to reserve a guard interval in order to battle multipath and to enable operation in SFN networks. The guard interval, which is up to 25% of the symbol duration, is in effect a wasted time, because no information is transmitted during that time interval.

Although the guard time is used to address the multipath problem, it is a costly solution, since it reduces the capacity of the communication system. It would be highly desirable to use other means for solving the multipath problem, that would allow channel operation at full speed.

Therefore, it is a formidably difficult task to try and improve or change these complex communications standards.

Several methods are now used to separate signals transmitted over a common channel, including:
  TDMA—Time Division Multiple Access
  FDMA—Frequency Division Multiple Access
  DS-CDMA—Direct Sequence/Code Division Multiple Access CDMA systems may use either DS/CDMA or FH/CDMA. In DS/CDMA multicode or DS/Multicode/CDMA, the separation of signals transmitted over a common channel is achieved using orthogonal codes.

At present, a problem in DS/CDMA is how to generate these orthogonal codes. It is possible to have N channels using orthogonal Walsh codes to multiply each channel, wherein each user has a different Walsh code. In the downlink channel (DL), that is the channel from the base station to subscribers, the orthogonality is preserved, since transmission to all users is prepared and transmitted at the same time. Each user receives all the encoded messages at the same time.

In the uplink, however, each user has a different timing because of a different propagation time delay.

Thus, each Walsh code (corresponding to a specific user) may be shifted in time relative to the other codes (that correspond to the other users). This effect creates interference between channels.

The problem is further aggravated by multipath, that may cause the phase shift in each channel to change in time.

In prior art CDMA, alignment up to a portion of one chip was required to maintain orthogonality between signals. This is a severe requirement, that affects the cost and complexity of the communication equipment.

A reduced orthogonality may cause a higher level of inter-user interference, caused by cross-correlation effects.

Undesired frequency deviations pose a difficult problem in the uplink channel (from subscribers to base), since the base has to concurrently receive and process signals from a plurality of subscribers: each subscriber may have a different deviation, from Doppler Or other causes.

If part of the signals from one user overlap with another's because of a frequency deviation, these signals cannot be separated in the receiver—the damage cannot be repaired, and it may cause interference between users.

Various attempts in prior art at solving this problem are not effective.

In one prior art system, there are a plurality of receivers at the base station, each receiver is tuned to one subscriber transmitter, with a closed loop to track and correct frequency deviations in that transmitter.

Such an approach may be highly complex and expensive when there are a large number of subscriber units.

The above solution cannot be used where subscribers share a common channel, rather frequency multiplexing is used, a different band for each subscriber.

The present disclosure presents a more effective approach, which allows higher performance and flexibility at a lower cost, using a common receiver at the base, for processing signals from all the subscriber transmitters.

In this approach, however, performance degrades rapidly if there are frequency deviations in the received signals. As frequency variations may have different values for the various subscribers, the common receiver cannot track them.

Wideband Systems, and more so broadband systems, are very sensitive to such frequency deviations, which may cause a deterioration in the orthogonality of subcarriers and information in the received signals, resulting in errors, thus reducing channel quality.

A Doppler frequency shift may result from a mobile subscriber's motion. For example, at a frequency of 2 GHz and a vehicle velocity of 100 km/h, a Doppler of about 185 Hz is expected. The received signal may have any value of deviation, between −185 Hz and −185 Hz; the deviation will usually change with time; the same applies to the other subscribers.

At a higher velocity and/or frequency, a larger Doppler deviation is expected (the Doppler deviation is proportional to velocity and frequency). There are other sources of undesired frequency deviations, such as multiplexers in a fiber-optic channel, etc.

In another prior art system, the subscriber locks on a signal from the base and transmits at that signal. One or more pilots may be used. This, however, will not correct for frequency deviations due to multiplexers in the charnel, both in the downlink and the uplink: as the signal from base deviates because of various causes, the signal received back at the base accumulates all the deviations on the way.

This system will not solve the Doppler frequency shift: assuming a moving subscriber receiving a signal from the base at a frequency deviation of +Fd, if it transmits at the received frequency, then the signal received at the base will have double the deviation or +2 Fd, since the Doppler acts the same way in both directions.

Another problem in prior art uplink channels is the need for signals from all the subscribers to arrive at about the same time window at the base, to allow their processing together. Due to different distances to base, the subscribers will be received each at a different time delay—a subscriber farther from base will have a longer time delay.

Yet another problem in prior art communications is the need for dynamic allocation of channels: The radio spectrum is a precious resource; allocating it wisely is of paramount importance.

Various users need each a different channel capacity—some say want to send or receive pictures, which require large amounts of data; others transmit voice or music, which requires less data; others are idle, thinking or waiting for something. Each user's needs may change at a moment's notice. It would be highly desirable to provide a system and method for allocating bandwidth in the amount required by each user—to each user to allocate bandwidth in the system, dynamically, according to their momentary needs.

Prior art systems apparently do not disclose a system similar to that detailed in the present disclosure.

Thus, Seki et al., U.S. Pat. No. 5,771,224, discloses an orthogonal frequency division multiplexing transmission system and transmitter and receiver therefor. It transmits an OFDM transmission frame, with null symbols and reference symbols being placed in the beginning portion of the frame and QPSK symbols are placed in an information symbol data region in the frame, with equal spacing in time and frequency.

The carrier amplitude and phase errors are corrected by a correction information producing section on the amplitude and phase variations of the received signal detected by the variation detector to produce corrected information.

Apparently, Seki does not address the problem of reverse link transmissions. Moreover, Seki performs a different type of signal processing.

Baum et al., U.S. Pat. No. 5,802,044, discloses a multi-carrier reverse link timing synchronization system. A center station transmits a forward link signal, receives a reverse link signal, and determines a timing offset for signals received on a reverse link timing synchronization channel. A reverse link symbol timing synchronization can be used in a system having a plurality of transmitting overlap bandwidth subscriber units on an OFDM-like spectrally overlapping reverse channel. The modulation method may comprise M-ary Quadrature Phase Shift Keying(M-PSK), M-ary Quadrature Amplitude Modulation (QAM) or other digital modulation method.

Gudmundson et al., U.S. Pat. No. 5,790,516, discloses a method and system for pulse shaping for data transmission in an orthogonal frequency division multiplexed (OFDM) system.

SUMMARY OF THE INVENTION

The present disclosure relates to improvements in OFDM-based digital communications. The scope and spirit of the invention are better described with the inclusion of specific applications thereof.

One application of the invention relates to the conversion of a DVB-T unidirectional link to a bi-directional link wherein enhanced subscriber units can coexist with standard, limited performance units.

A second application relates to a higher performance bi-directional OFDM link. A third application relates to improvement in the performance of an OFDM unidirectional broadcast system.

A further improvement is achieved with a combination of OFDM in the uplink and CDMA on OFDM.

According to one aspect of the present invention, the guard time interval during DVB broadcasting is advantageously used for transmission in the other direction, that is from subscribers to base station.

An interactive system is thus achieved, using the existing bandwidth so that no additional frequency allocation is required. The guard time, that was hitherto wasted, will now be utilized to achieve a bi-directional interactive system.

Especially shaped windows in the time domain are applied in order to extend the transmission time of each end, that is the base station and the subscriber unit. This allows to shorten the reception time, to leave more time for transmission back to the base station. A truncated transmission results in sidelobes in the frequency domain, that is a ripple signal that may cause inter-symbol interference. To correct for this effect, a window is applied that results in lower sidelobes. Additionally, equalizer means (for example a transversal filter) may further reduce the remaining sidelobes in the frequency domain.

A shortened receive time has the additional benefit that transmission to the base station can start earlier in time, so that enough time is left for transmission in the other direction.

For example, a DVB-T or DAB unidirectional link can be converted to a bi-directional link. Enhanced subscriber units can coexist with standard, limited performance units. This preserves full compatibility with subscriber units that do not have the new transmit capability and require a constant transmit power. The window is only applied in the receiver of subscriber units that are converted to bi-directional operation.

According to the present invention, various unidirectional point-multipoint systems may be converted to bi-directional. These may include TD, TDD or FDD modulation systems.

OFDM systems may be used without a guard time interval, using equalization and pulse shaping techniques. This increases the channel capacity.

Where the system retains the guard time interval, this interval is now used for the transmission of useful information.

For example, in a FDD modulation communication system with only a downlink channel, an uplink channel may be added having orthogonal properties with respect to the downlink. In this example, the uplink may use a different frequency band, to achieve orthogonality in the frequency domain.

A second application relates to a higher performance OFDM bi-directional link. This is implemented with a window being applied both in the transmitter (the base station) and the receiver. A matched filter system is achieved that has better signal to noise performance. An equalizer may be used to improve the performance of the channel.

A further improvement is achieved with a combination of OFDM in the uplink and FH/CDMA on OFDM.

According to the present invention, the base station further includes means for coordinating the operation of the subscriber units, including:

Automatic Synchronization Control (ASC)

Automatic Power Control (APC)

Automatic Frequency Control (AFC).

ASC signals sent from the base station are used to bring all the subscriber units in synchronization with the base station, thus maximizing the transmission time and preventing transmission overlap between subscriber units and the base station.

APC signals sent from the base station to each subscriber unit are used to control the transmit power of each subscriber unit so that signals received at the base station from the various users have about the same power. This achieves more efficient processing at the base station and helps minimize ISI to nearer subscribers.

The AFC loop at the subscriber unit locks onto the frequency of a signal received from the base station. The AFC then generates a transmit signal having a frequency derived from that of the signal received from the base station. The various clocks in the subscriber unit are also derived from the signal that is locked to the base frequency.

Thus, the subscriber will transmit a signal to the base station, at a frequency that is equal or close to the correct value of a signal to be received in the base station.

The use of AFC in the mobile stations helps achieve nearly orthogonality between subscriber units transmitting to the same base station.

Frequency diversity may be used to enhance the link with a particular subscriber unit that has lower power or weaker gain. By allowing that unit to simultaneously transmit the same data over more than one channel, the lower gain or power is corrected for, to achieve the desired performance of the communication channel. In the receiver, a coherent maximum ratio combiner may be used to combine the channels so as to achieve best reception.

A dynamic frequency allocation to subscribers may be implemented, responsive to the needs of each user at any given time. This implements a bandwidth on demand scheme.

An OFDM uplink channel comprising N frequency carriers may be shared between several simultaneous subscriber units, with each unit utilizing part of the frequency carriers to transmit its own data. As each subscriber unit utilizes Mi carriers, the sum of all the carriers utilized Mi equals the total number N of carriers in the channel.

Each subscriber unit may use a different number Mi of carriers, according to its bandwidth demand.

Furthermore, by allocating to each subscriber unit several carriers that are separated from each other (not adjacent to each other), a frequency hopping effect is achieved that reduces frequency selective fading.

Canceling the guard time interval, and the use of especially shaped windows in the time domain, together with signal processing in the receiver, will imitate the guard time interval so as to protect against ISI.

This third application of the invention relates to improvements in the performance of the unidirectional OFDM broadcast system.

The performance of existing standards like DVB-T, DAB, Hiperlan (ETSI BRAN), Hiperaccess (IEEE 802.11) may be improved using the abovedetailed methods and systems according to the present invention.

To preserve the separation between users in a CDMA communication system, an OFDM/CDMA system is disclosed. The system includes carrier and timing correction means to achieve improved performance.

This system is effective even in the uplink channel, where there may be a time difference between signals received from the various users.

This method and system achieve better performance with respect to prior art CDMA. CDMA is based on orthogonal codes being allocated to the various users. The codes, however, are orthogonal only if they are received at the same time. In prior art systems the various signals may be received with different relative time delay, so they are no more orthogonal as intended.

In the novel system and method, using OFDM to achieve synchronous reception of the various signals, the CDMA codes are received concurrently. Thus, in the novel approach the various transmissions are synchronized.

This achieves orthogonality between the various CDMA transmissions. Thus, the above scheme may achieve improved performance relative to CDMA.

A novel architecture is disclosed, of an OFDM system with precise frequency setting in each unit.

A plurality of transceivers are used, each with its own frequency reference/timing unit.

A transmitter includes an IFFT processor operating on a plurality of inputs for all the users. Furthermore, a pulse shaper may be used to reduce the Guard Interval (GI) time.

Using a closed loop control, the base may shift the user response forward or backward, until it is received at the center location in time with all the other uplink users. That is, all the users in the uplink channel will be received during the same time window.

To implement the above method, Automatic Synchronization Control (ASC) signals are sent to the mobile subscribers. These signals correct the transmit time of each subscriber. The signal's value is stored in the mobile unit for subsequent transmissions.

The performance is further improved with each user including means to be frequency-locked to the base (AFC). Each mobile user locks its frequency to a transmission from the base. The stabilized frequency is then used to transmit back to base, at a known, expected frequency.

An OFDM/TDD system is disclosed that achieves improved orthogonality between signals for the various users, while allowing for more relaxed timing requirements. This achieves a system that is easier to implement. Moreover, the novel system may be allocated per bit in each carrier, to may achieve less sensitivity to interference and multipath.

Moreover, in the novel system the guard interval forms a shorter percentage of the time interval. That is, the guard interval is shorter relative to the symbol duration. This helps achieve a more efficient communication system, where less time is wasted for the guard interval.

Further objects, advantages and other features of the present invention will become obvious to those skilled in the art upon reading the disclosure set forth hereinafter.

DETAILED DESCRIPTION OF THE PREFERRED EMBODIMENTS

A preferred embodiment of the present invention will now be described by way of example and with reference to the accompanying drawings.

Figure 1:
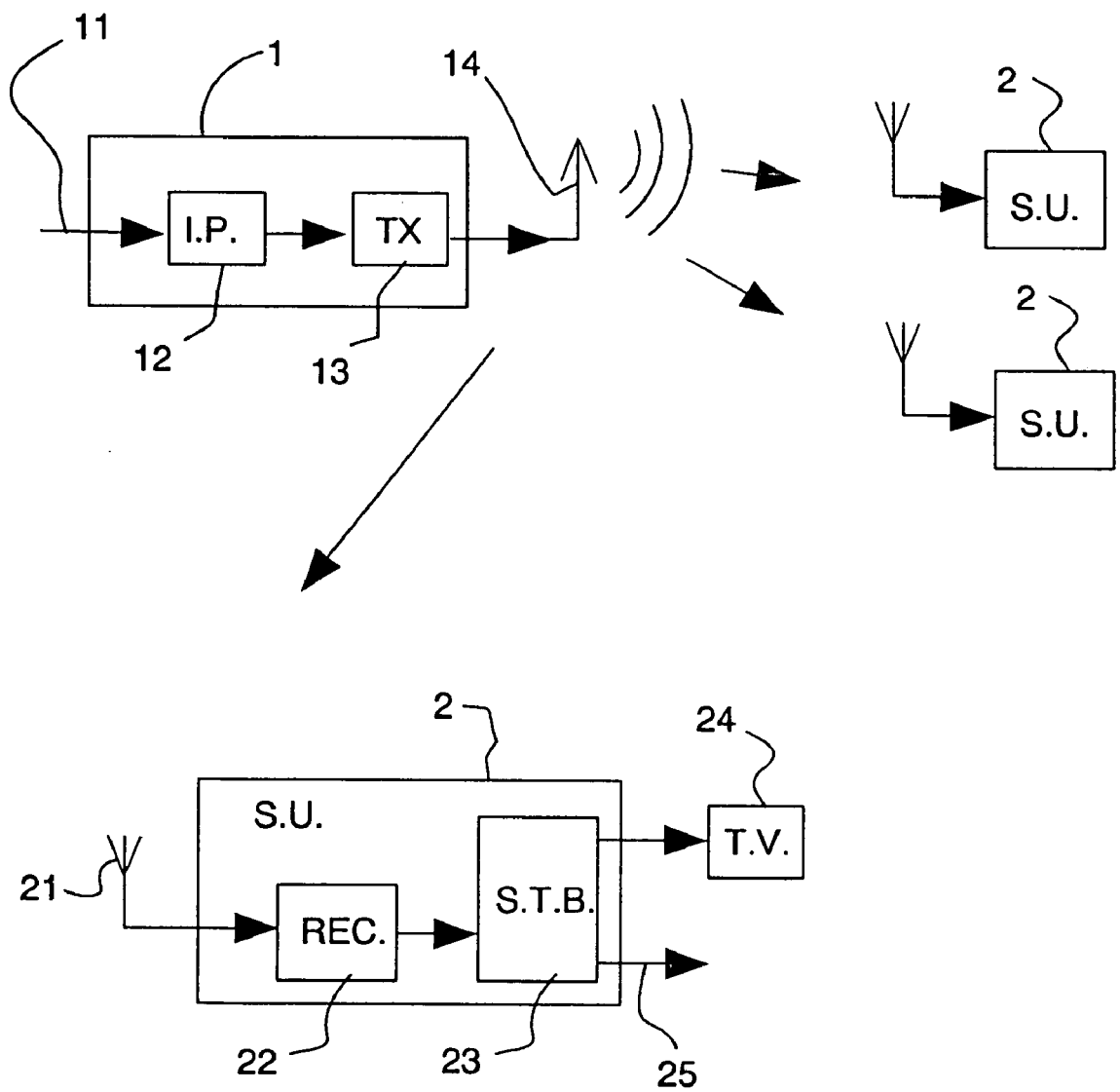
FIG. 1 illustrates a digital information broadcasting system using OFDM (prior art).

FIG. 1 illustrates a prior art digital information broadcasting system using OFDM. The system includes a base station 1 that transmits to a plurality of subscriber units 2.

A data input channel 11 brings to the base station 1 the video, audio and/or data to be broadcast to the subscriber units 2.

An information processor 12 performs the required modulation, using for example QPSK, M-QAM, M-DAPSK or another digital modulation method. The OFDM transmitter 13 includes means (not shown) for performing an Inverse FFT (IFFT), DAC means for converting the digital signals to an analog voltage and for generating an RF signal modulated accordingly. The RF signal is then transmitted through antenna 14 and the wireless channel to the subscriber units 2.

A subscriber unit 2 (receiver) includes means for performing the abovedetailed process in reverse. That is, antenna 21 receives the RF signals that are subsequently converted to baseband in the OFDM receiver 22. The OFDM receiver 22 further performs the required signal processing and FFT (Fast Fourier Transform) to restore the modulated signals. The set top box 23 extracts the transmitted signals that are delivered to a television 24 and/or a data out channel 25.

Figure 2:
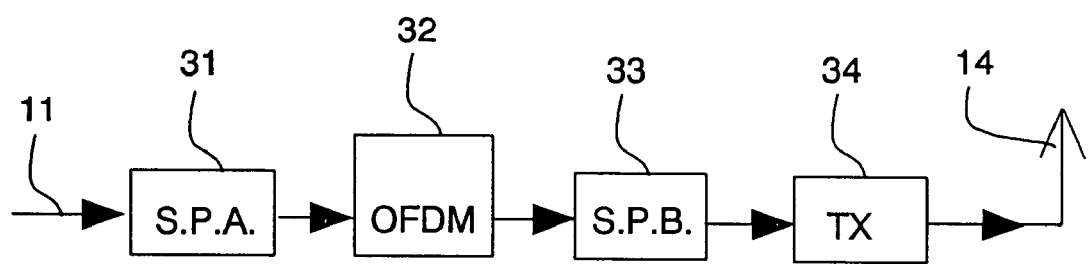
FIG. 2 details the complex signal processing being implemented in digital broadcasting with OFDM/DVB-T (prior art).

FIG. 2 details the complex signal processing being implemented in prior art digital broadcasting with OFDM/DVB-T.

A data input channel 11 conveys the source signals to be broadcast to the subscriber units 2.

The source signals may include, for example, MPEG-2 signals.

The signal processing (A) 31 comprises means (not shown) for performing a dual channel processing that includes MUX adaptation and energy dispersal, outer coder, outer interleaver, inner coder and inner interleaver.

The signals are further processed in a mapper and undergo frame adaptation. Pilot signals and Transmission Parameters Signaling (TPS) signals are added to the processed signal.

An OFDM processor 32 performs the required IFFT process.

The OFDM may implement, for example, a 2 k (2048 carriers) or 8 k (8192 carriers) IFFT. The multicarrier nature of OFDM allows for relatively longer symbol time periods, for example about 224 microseconds in a 2 k DVB-T system.

The signal processing (B) 33 may include means (not shown) for the insertion of a guard time interval and DAC means for converting the resulting digital signals to an analog voltage for transmission.

The transmitter 34 and antenna 14 are used to generate and transmit, respectively, an RF signal modulated with the abovedetailed complex signal.

Figure 3:
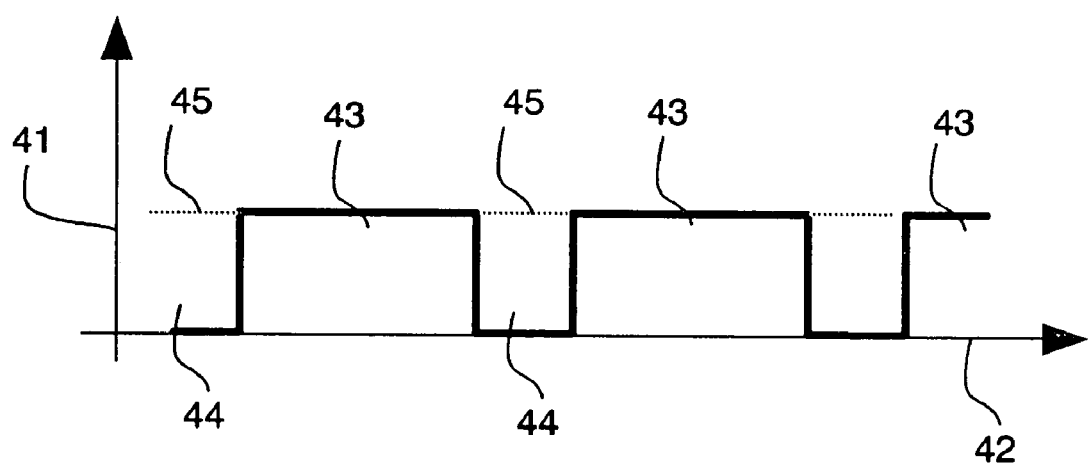
FIG. 3 details the timing of transmitted signals in OFDM, using guard time intervals (prior art).

FIG. 3 details the timing of transmitted signals in prior art OFDM, using guard time intervals, illustrating a base broadcast signal 41 vs. time 42.

The base station alternately transmits symbol time periods 43, used for information transmission, and guard time periods 44, used to separate between adjacent symbols.

A "filling" signal 45 may be transmitted during the guard time 44; this signal may comprise a repetition of part of the signal transmitted in the symbol time period 43.

As detailed above, the guard time period may be advantageously used to decrease the multipath effect.

Figure 4:
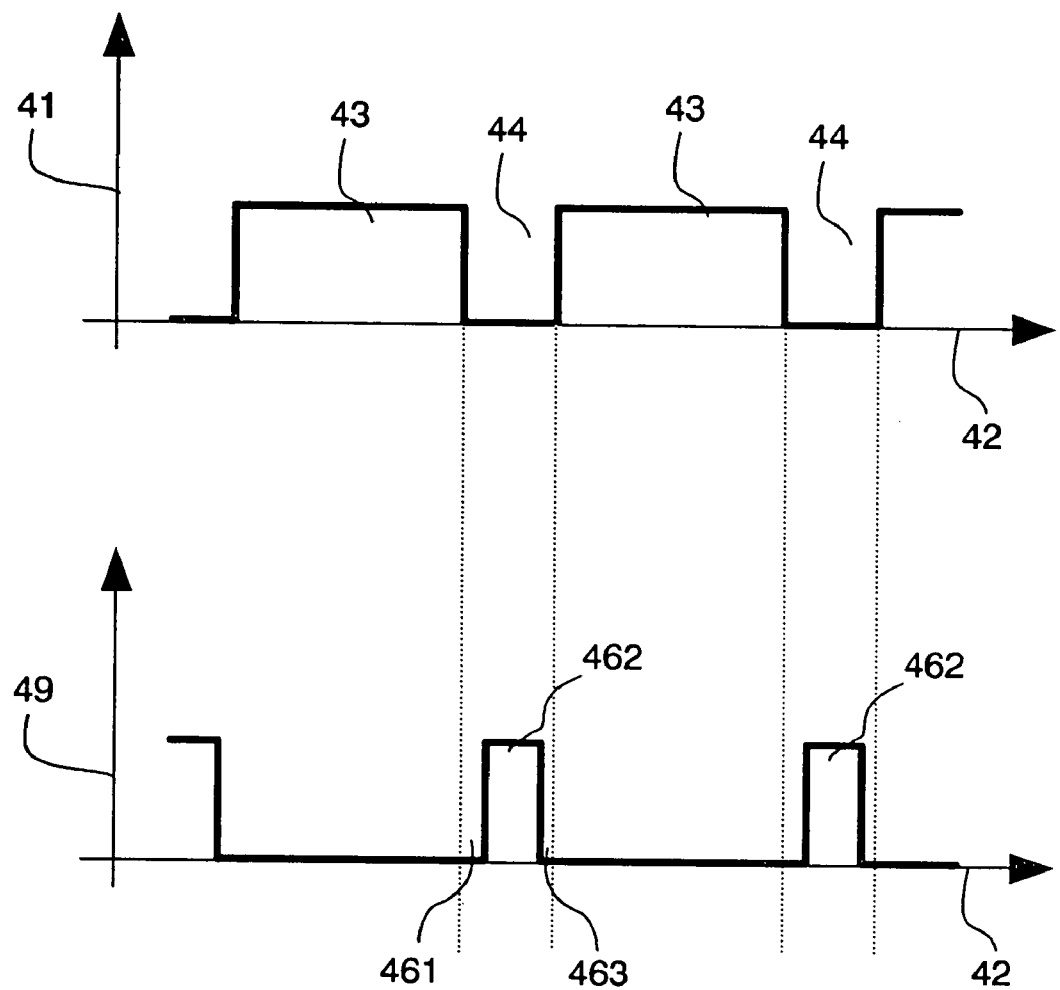
FIG. 4 illustrates the principle of a return channel using TDD, utilizing the guard time intervals.

FIG. 4 illustrates the principle of a return channel using TDD, utilizing the guard time intervals 44. Again, the graphs illustrates the base broadcast signal 41 vs. time 42, with the signal comprising symbol time periods 43 with guard time periods 44 interspersed therebetween.

Here, however, the guard time periods 44 are used for the return channel, as illustrated with the graph for the return channel signal 49 (from subscriber unit) vs. time 42.

Thus, the present invention provides means for converting an OFDM unidirectional link to a bi-directional link.

The present disclosure includes both a general description relating to OFDM systems, as well as examples of specific applications like DVB-T.

A bi-directional link may be highly desirable, to allow for example fast Internet access, E-mail services and/or Telephone and Video on Demand (VOD). Other applications may include ISDN/PSTN, Frame Relay and ATM, down to the individual subscriber's home.

Thus, the guard time interval during DVB broadcasting is used for transmission in the other direction, that is from subscribers to base station. An interactive system is thus achieved, with no additional frequency allocation being required.

If several users transmit in the guard interval using different frequency bins, then they may be locked to the base frequency and clock using the AFC local loop. A local signal is generated that is locked to the frequency of the base station.

That local signal may be used as a reference for the transmit synthesizer. This method and system may be used to achieve orthogonality between the signals in the frequency domain.

This novel approach achieves a Time Division Duplex (TDD) system, wherein transmissions from the base and from the subscriber are separated in time.

The use of TDD allows for an implementation using lower cost hardware, thus reducing the cost to users.

The system and method of the present invention may be used in TDD as well as TD—these are methods used in the art, having a different sequence of base/subscriber on the communication channel.

The System may implement a wideband Internet link, with the base concurrently transmitting information to many subscriber units, with each subscriber unit extracting the information addressed to it.

In the uplink channel, subscriber units may share the channel in a TDMA scheme, over the now unused guard time (GI) of the base station.

In another embodiment of the present invention, the system may be used in either low speed or high speed telephony, at rates like 64 kbps or 144 kbps or higher.

It is possible to transmit in a TDMA and/or OFDMA scheme for sharing with other users, over the now unused guard time of the base station.

In yet another embodiment of the invention, the system may be used in video communications and/or video teleconferencing applications. Again, many users may share the channel in a TDMA/OFDMA scheme, over the guard time period.

In one implementation, the actual return time period 462 is shorter than the total available guard time period 44. This leaves a pre-transmission guard time 461 and a post-transmission guard time 463, to better isolate the signals in the two directions.

The guard time intervals 461 and 463 should take into account the propagation time between the base station and the subscriber unit, to prevent interference at the base station between the transmissions in opposite directions. Thus, the delayed return signal 49 that reaches the base station should terminate before the base station starts the next transmission, for the next symbol.

This is achieved by leaving a larger post-transmission guard time 463. To achieve a still longer time interval 463 (that corresponds to a larger distance to the base station) and a longer transmit time 462, the pre-transmission guard time 461 may be shortened or even canceled altogether.

It is even possible (not shown) to start the return signal 49 earlier, before the end of the base signal 41 transmission. This will not interfere with the normal reception at the subscriber unit, since the receiver will extract the transmitted information before the transmission ends. The application of a window in the subscriber receiver (see description with reference to FIG. 5 below) protects that receiver from interference at the start of the return channel transmission, even in case of overlap as detailed above.

The early return channel transmission (that is, starting before the base station transmission ends) will not interfere with reception at other subscriber units, for several reasons: Whereas the base station has a high antenna that achieves good communications with the various subscriber units, the subscriber unit antennas are lower, so that communication between users undergoes a higher attenuation. Moreover, some of the subscriber units use directional antennas and point toward the base station. Additionally, the subscriber units transmit at a lower power.

All the above factors contribute toward a good reception of the return channel at the base station, with a satisfactory low level of interference between the subscriber units. This improved performance is even achieved in the early transmission case, wherein the subscriber units starts its transmission before the base station ends each transmitted symbol.

A possible problem is the inter-symbol interference because of the sharp on/off switching of the signals, that correspond to a square wave window. It is well known that a square wave window results in spurious elements in the frequency domain, with harmonics having a sync (sin(x)/x) envelope.

The broadcast signals 43 from the base station will exhibit this property since there is no transmission during the guard time interval 44, when there is no perfect synchronization between transmitter and receiver.

The signals 462 transmitted from the subscriber units will exhibit the same property because of the square wave window or envelope of these signals.

Figure 5:
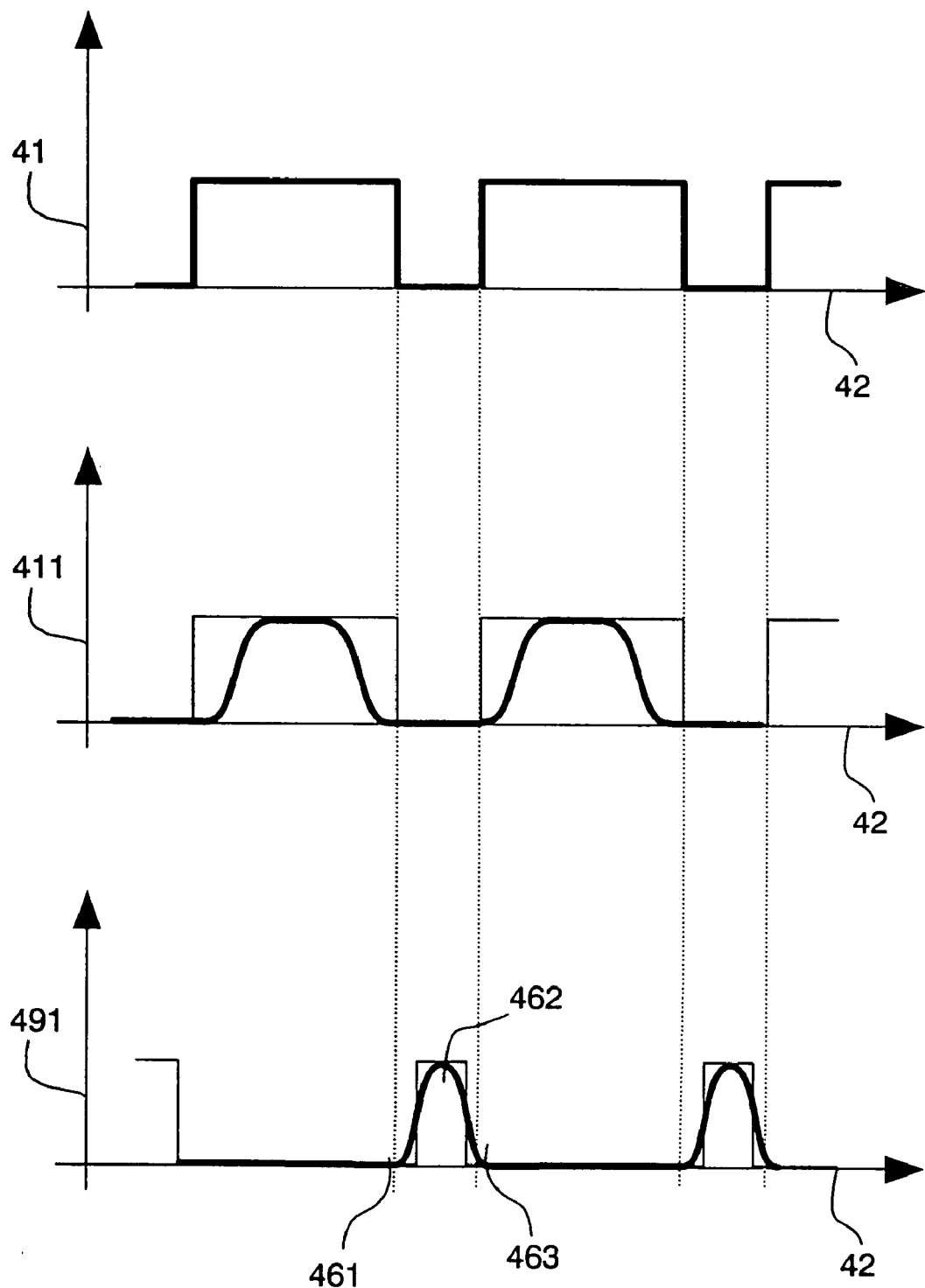
FIG. 5 details the application of windows in the bi-directional channel.

The present disclosure presents a solution to the above problems, as detailed in FIG. 5, with the application of windows in the bi-directional channel. The gradual windows as illustrated will decrease the power of the spurious elements that result from the switching of the transmitted signals. Moreover, the window allows for a shorter time transmission of the symbols 41 from the base station. This leaves more time for the reverse channel.

FIG. 5 thus illustrates the original base broadcast signal 41 vs. time 42. That broadcast signal is processed to result in the windowed base broadcast signal 411 as illustrated.

Various types of windows may be used, for example a Blackman, a modified Blackman or a raised cosine window.

The signal in the return channel undergoes processing as well, to form the windowed return channel signal 491 (from subscriber unit) vs. time 42 as illustrated.

The windows thus form the actual return time period 462, together with a pre-transmission guard time 461 and a post-transmission guard time 463.

As explained above, post-transmission guard time 463 will prevent interference between transmitted signals in both directions at the base station, as required. The pre-transmission guard time 461 may be made shorter or canceled altogether or made negative (that is, return transmission from the subscriber unit starts before the end of the transmission from the base station).

It is possible to use the presented techniques for either unidirectional or bidirectional OFDM links.

Figure 6:
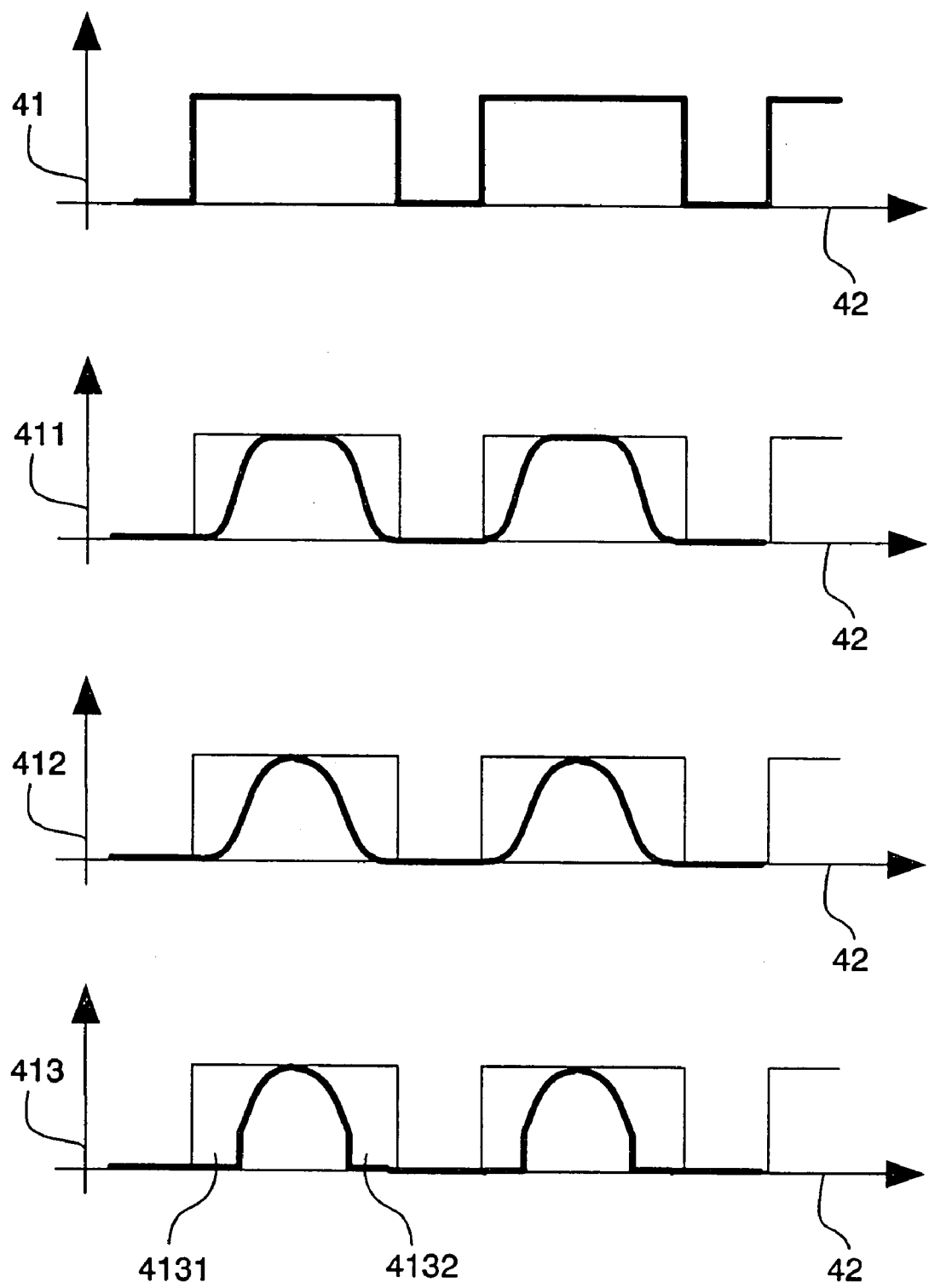
FIG. 6 details various types of windows that may be employed.

FIG. 6 details various types of windows that may be employed. Again, the original base broadcast signal 41 vs. time 42 is processed to result in the windowed base broadcast signal 411. Using another window will result in a second type of windowed broadcast signal 412. Similarly, a third type (truncated) of a windowed broadcast signal 413 may be generated, including a pre-transmission truncated zone 4131 and a post-transmission truncated zone 4132. The rational for the third signal 413 is as follows: the applied window reduces the harmonics that would otherwise result. At the point where the signal has a negligibly small amplitude, it can be truncated (reduced to zero) without much of an interference being generated.

Thus, especially shaped windows in the time domain are applied in order to extend the transmission time of each end (at the base station and the subscriber unit). More time is left for transmission back to the base station. A truncated transmission results in sidelobes in the frequency domain, that is a ripple signal that may cause inter-carrier interference ICI.

To correct for this effect, a window is applied that results in lower sidelobes.

Additionally, equalizer means (for example a transversal filter) may further reduce the remaining sidelobes in the frequency domain.

Thus, using equalizing means and/or pulse shape means may reduce the effects of multipath, without the need for a guard time interval. The guard time interval may be reduced or eliminated.

Where the guard interval is retained, it may be used for information transmission.

A shortened receive time has the additional benefit that transmission to the base station can start earlier in time, so that the transmitted signal reach the base station before the start of the new frame. Thus enough time is left for transmission in the other direction, also taking into account the propagation time.

An example of one application of the invention relates to the conversion of a DVB-T unidirectional link to a bi-directional link wherein enhanced subscriber units can coexist with standard, limited performance units.

To this effect, the base station transmits signals without a window, that is the transmission has a constant transmit power except for the guard time where the power is zero.

This preserves full compatibility with subscriber units that do not have the transmit capability and require a constant transmit power. The window as detailed in this disclosure is only applied in the receiver of subscriber units that are converted to bi-directional operation.

The above method may be used for various transmission standards, not only with DVB-T. The application in DVB-T was used as an illustration of the novel invention. The method may be used in other communication areas, without departing from the scope and spirit of the present invention.

A second application relates to a higher performance OFDM bi-directional link. This is implemented with a window being applied both in the transmitter (the base station) and the receiver. By using complementary windows at transmit and receive, a matched filter system is achieved that has better signal to noise performance. An equalizer may be used to improve the performance of the channel.

According to the present invention, the base station further includes means for coordinating the operation of the subscriber units to achieve higher performance and lower mutual interference, as detailed below.

Figure 7:
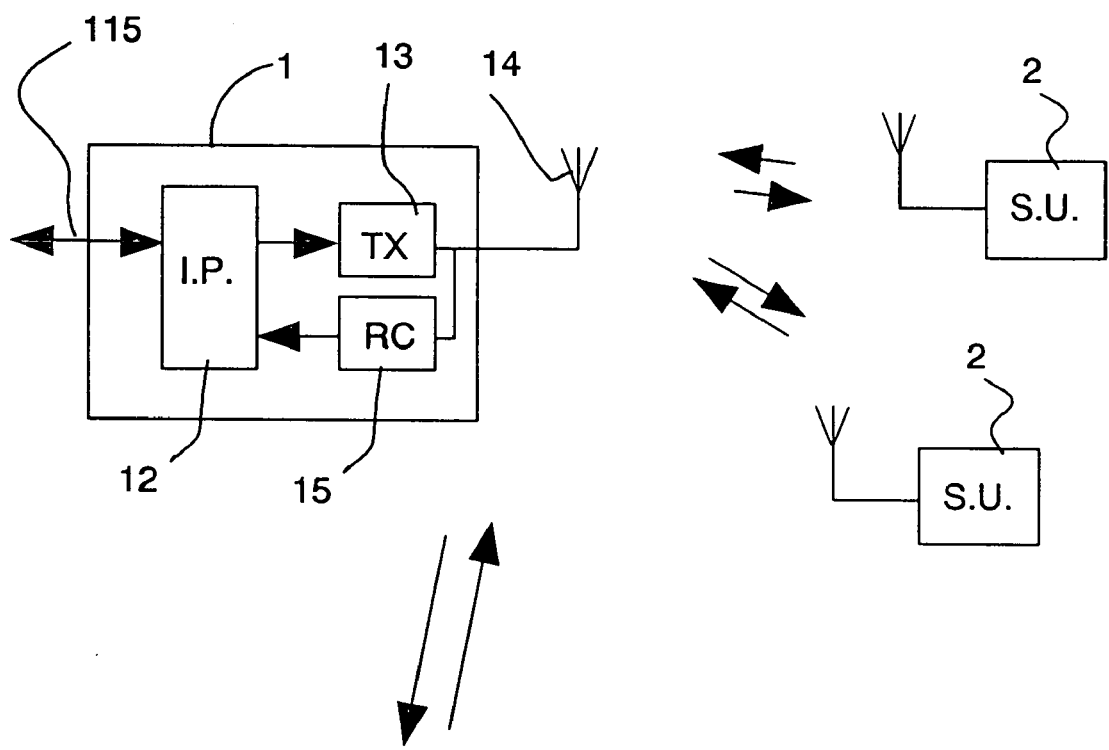
FIG. 7 illustrates an OFDM broadcasting system converted to a bi-directional channel.
Figure 7:
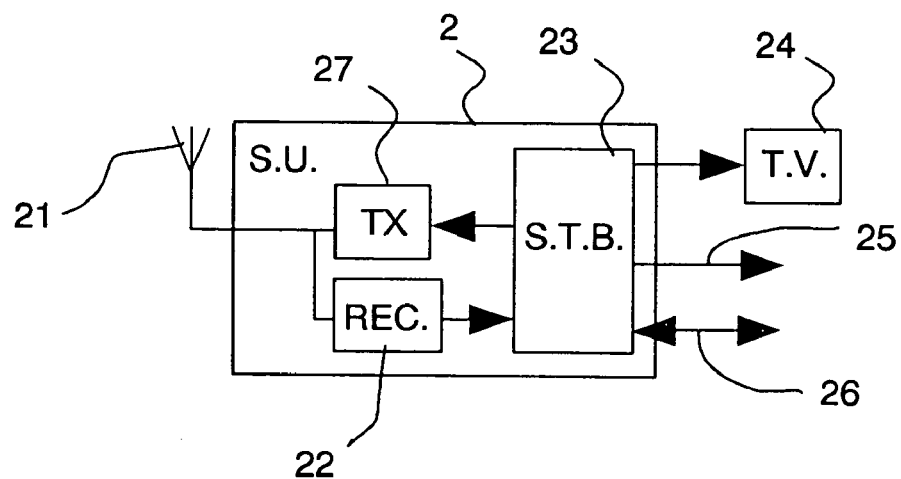

FIG. 7 illustrates an OFDM broadcasting system converted to a bi-directional channel. A base station 1 may have various types of channels, for example it may have a data in/out channel 115.

An information processor 12 may implement for example a MPEG-2 video protocol and all the necessary DVB-T operations.

Throughout the present disclosure, a mention of MPEG-2 signal or protocol should be understood to refer to just one example of an embodiment of the present invention. Many other protocols and/or signals may be used as well.

The OFDM transmitter 13 is used to process the information to be sent to users, in a structure similar to that in use today. A substantial addition to this structure is the OFDM receiver 15 that is used to receive information in the return channel from the subscriber units. The antenna 14 is now used both for transmission and reception. Alternately, separate antennas (not shown) may be used for transmit and receive.

The subscriber unit 2 includes an antenna 21, an OFDM receiver 22 and an OFDM transmitter 27. A set top box 23 connects to a television 24 and provides a data out channel 25 as well as a bi-directional channel 26 that may be used with various bi-directional devices.

According to the present invention, various unidirectional point-multipoint systems may be converted to bi-directional. These may include TDD or FDD modulation systems.

In prior art, the mobile units only received signals from the base station. According to the present invention, each mobile unit now also include means for transmitting signals to the base station to implement an uplink channel, in addition to the existing downlink.

The signals in the uplink are orthogonal with the signals in the downlink.

The base station includes receiving means for the reception of the orthogonal signals from the mobile units.

In one embodiment of the uplink channel, OFDM systems are used without a guard time interval, using equalization and/or pulse shaping techniques. This increases the channel capacity.

In another embodiment, where the system retains the guard time interval, this interval may now be used for the transmission of useful information. The guard time can be used for information transmission since the function of the guard time is implemented with other techniques, including equalization and/or pulse shaping techniques.

For example, in a FDD modulation communication system with only a downlink channel, an uplink channel may be added having orthogonal properties with respect to the downlink. In this example, the uplink may use a different frequency band, to achieve orthogonality in the frequency domain.

In a TDD modulation communication system, orthogonality may be achieved in the time domain.

Figure 8:
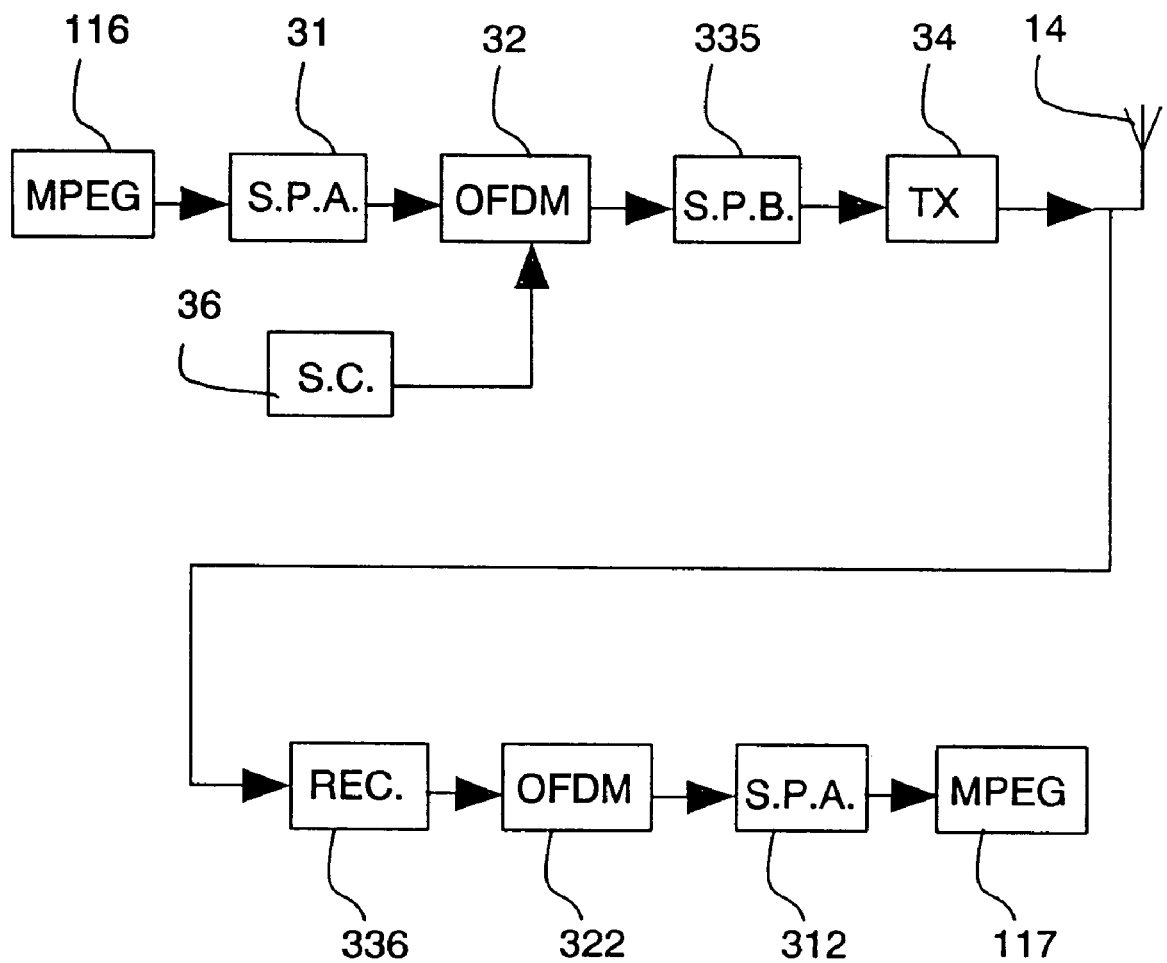
FIG. 8 details the structure of an OFDM base station adapted for bi-directional operation.

FIG. 8 details the structure of an OFDM base station adapted for bi-directional operation. The example detailed here refers to an MPEG-2 signal. Throughout the present disclosure, it is to be understood that a reference to MPEG-2 refers to just one embodiment of the invention. Various other types of data may be used, without departing from the scope and spirit of the present invention.

Signals from a MPEG-2 source coding and multiplexing 116 are processed in the transmit channel that includes a signal processing (A) 31, followed with an OFDM processor 32 and a signal processing (B) 335. Unit 335 is a modified processor, with a window. The transmit channel further includes a transmitter 34 and antenna 14, that are used to transmit the information to subscriber units (not shown).

The novel processing performed in the transmit channel includes the following stages:

A. Modulation of the MPEG-2 data in, or other modulation corresponding to that in the transmitter, like QPSK, QAM etc.

B. IFFT processing in the OFDM processor 32.

C. Signal shaping, including the application of a window in time to the received signals. The window may be one of those illustrated in FIG. 6. Note that there are two possible embodiments of the present invention: in a first embodiment, where compatibility with existing DVB-T is required, no window is applied in the transmit channel. In a second embodiment, for a higher performance OFDM, a window is applied in the transmit channel, that corresponds to the window in the receive channel.

D. Digital to Analog Conversion DAC, followed by the RF transmit module and the antenna.

The base station further includes a subscriber controller 36 for coordinating the operation of the subscriber units to achieve higher performance and lower mutual interference.

The subscribers controller 36 performs the various functions of controlling the subscriber units, including ASC, APC and AFC as detailed below. The control signals are transmitted over the abovedetailed transmit channel, to be acted upon at the subscriber units.

Automatic Synchronization Control (ASC) signals sent from controller 36 in the base station are used to bring all the subscriber units in synchronization with the base station, thus maximizing the transmission time and preventing transmission overlap between subscriber units and the base station.

Automatic Power Control (APC) signals generated in controller 36 and sent to each subscriber unit are used to control the transmit power of each subscriber unit so that signals received at the base station from the various users have about the same power. This achieves more efficient processing at the base station and helps minimize ISI to nearer subscribers.

In one embodiment, the controller 36 further generates Automatic Frequency Control (AFC) data, that are sent from the base station to each subscriber unit to achieve nearly orthogonality between subscriber units transmitting to the same base station.

Alternately, each mobile user locks its frequency to a transmission from the base, using a PLL for example. The controller 36 may transmit a pilot signal to help the mobile units to achieve lock on. The mobile units include means to lock on to the pilot signal and to generate a stabilized/corrected frequency signal.

The stabilized frequency signal is then used to transmit to base at the expected frequency at the base. Further means for correcting for frequency deviations due to propagation are detailed below.

An important aspect of the present invention relates to the signal shaping in the receiver, as follows:

A. The receiver and signal processing (B) 336 is a modified processor. After the receiver stage, the baseband signal is converted to digital in an ADC. The signal shaping includes the application of a window in time to the received signals. The window may be one of those illustrated in FIG. 6.

B. FFT processing in the OFDM processor 322.

C. Signal processing (A) 312 that may include an equalizer or a transversal filter to correct for the effect of the applied window.

D. MPEG-2 source decoding 117, or other modulation corresponding to that in the transmitter, like QPSK, QAM etc.

Figure 9:
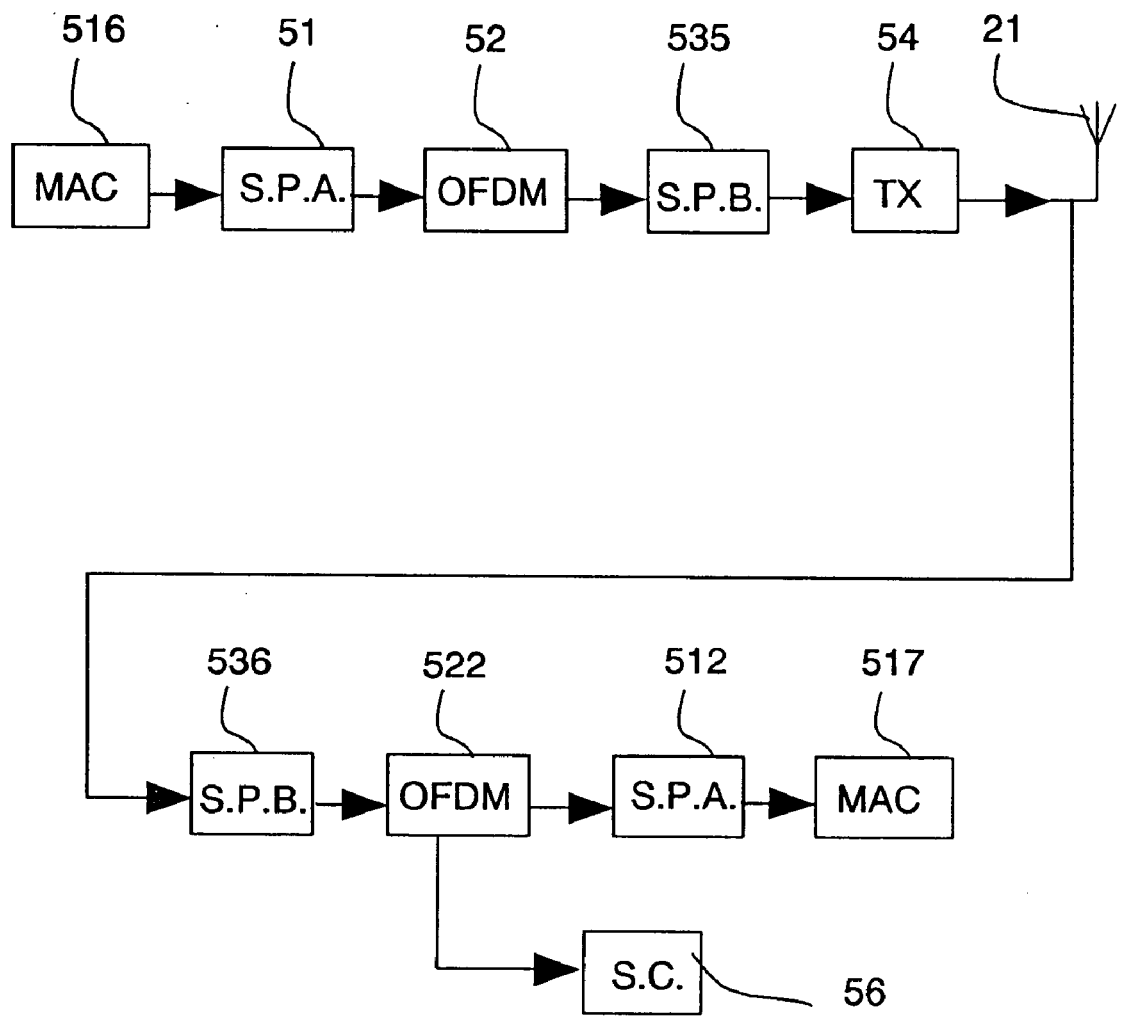
FIG. 9 details the structure of an OFDM subscriber unit adapted for bi-directional operation.

FIG. 9 details the structure of an OFDM subscriber unit adapted for bi-directional operation.

Basically, the operation of the transmitter and receiver channels in the subscriber unit is similar to that of the corresponding units in the base station, as detailed above with reference to FIG. 8.

Signals from a media access control 516 are transferred to a signal processing (A) 51, then to an OFDM processor 52 and a signal processing (B) 535. Signal shaping includes windows being applied in time to the transmitted signals as well as the received signals.

A transmitter 54 and antenna 21 are used to transmit to the base station.

A subscriber controller 56 is used to receive the control signals from the base station, including the abovedetailed ASC, APC and AFC signals.

The received signals are used to control the various functions of the transmit channel as required.

The receiver and signal processing (B) 536 is a modified unit, including a window in time that is applied to received signals. The OFDM processor 522 performs the FFT, and the signal processing (A) 512 performs the equalizer and modulation functions. The resulting signals may be transferred to a media access control 517.

Figure 10:
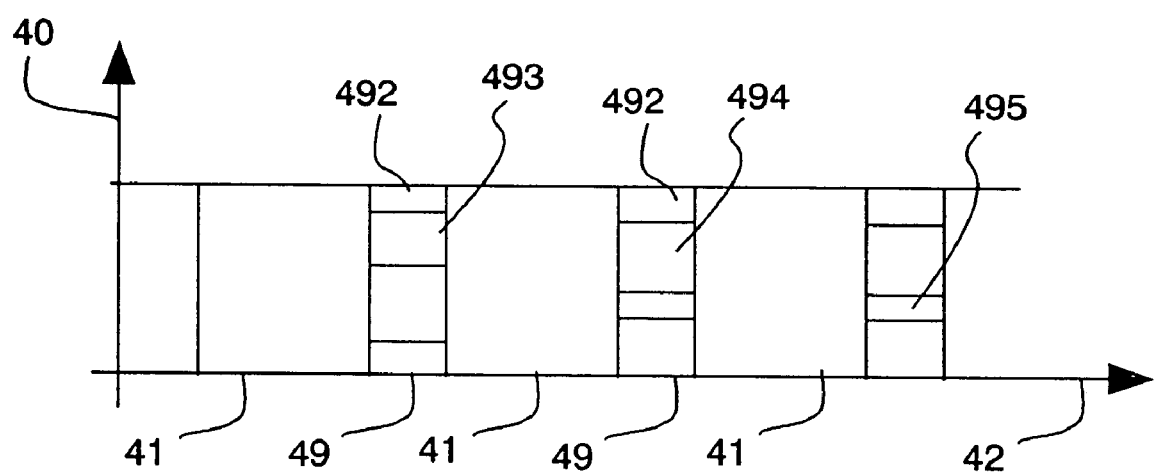
FIG. 10 details the spectrum of transmitted signals in a bi-directional channel with dynamic spectrum allocation to subscribers.

FIG. 10 details the spectrum of transmitted signals in a bi-directional channel with dynamic spectrum allocation to subscribers.

The communication channel includes bi-directional channel signals 40 (frequency domain) vs. time 42. The channel includes periods of base broadcast signal 41 alternating with periods of return channel signal 49 (from subscriber unit) vs. time 42 as illustrated. A return channel period 49 may contain a plurality of subbands, as illustrated with subscriber i subband 492, subscriber (i+1) subband 493, subscriber (i+2) subband 494 and subscriber (i+3) subband 495.

Frequency diversity may be used to enhance the link with a particular subscriber unit that has lower power or weaker gain. By allowing that unit to simultaneously transmit the same data over more than one channel, the lower gain or power is corrected for, to achieve the desired performance of the communication channel.

A dynamic frequency allocation to subscribers may be implemented, responsive to the needs of each user at any given time.

An OFDM uplink channel comprising N frequency carriers may be shared between I simultaneous subscriber units, with each unit utilizing part of the frequency carriers to transmit its own data. As each subscriber unit utilizes Mi carriers, the sum of all the carriers utilized Mi equals the total number N of carriers in the channel.

Each subscriber unit may use a different number Mi of carriers, according to its bandwidth demand.

Furthermore, by allocating to each subscriber unit several carriers that are separated from each other (not adjacent to each other), a frequency hopping effect is achieved that reduces frequency selective fading.

In DVB-T, for example, by controlling the relative transmission time to and from the base station, the information capacity of the channel in each direction may be defined.

Thus, a wideband channel is required from base to subscriber units, of about 5 Mbps (Megabit per second) for DVB-T to about 33 Mbps for HDTV (High Definition TV). In the other direction, however, a lower bit rate may satisfactory.

Dynamic control of the bandwidth allocated to each subscriber unit may be achieved with TDD, FDD or a combination thereof.

Frequency diversity may be implemented at the subscriber to compensate for low transmit power or low gain, to achieve better quality communications despite adverse channel conditions.

The improved use of the guard time may be applied not only in the return channel transmissions, but also for the improvement of the broadcasting channel.

Thus, a window as above detailed may be applied to the transmitted signals to achieve better frequency utilization and to increase the broadcast channel capacity, if so desired.

Canceling the guard time interval, and the use of especially shaped windows in the time domain, together with signal processing in the receiver, will imitate the guard time interval so as to protect against Inter-Carrier Interference ICI and Inter Symbol Interference (ISI).

This third application of the invention relates to improvements in the performance of the unidirectional OFDM broadcast system.

The various elements of the present invention may be advantageously used to improve communication links based on various standards, for example: DVB-T, DAB, Hiperlan (ETSI BRAN), Hiperaccess (IEEE 802.11).

Various embodiments of the above device and method may be implemented.

The abovedetailed system and method may be applied to fixed as well as to mobile subscriber units.

A base station may also employ frequency reuse, using a sectorial antenna to transmit the same frequency in different directions.

According to one aspect of the invention, a new system uses CDMA on OFDM.

Figure 11:
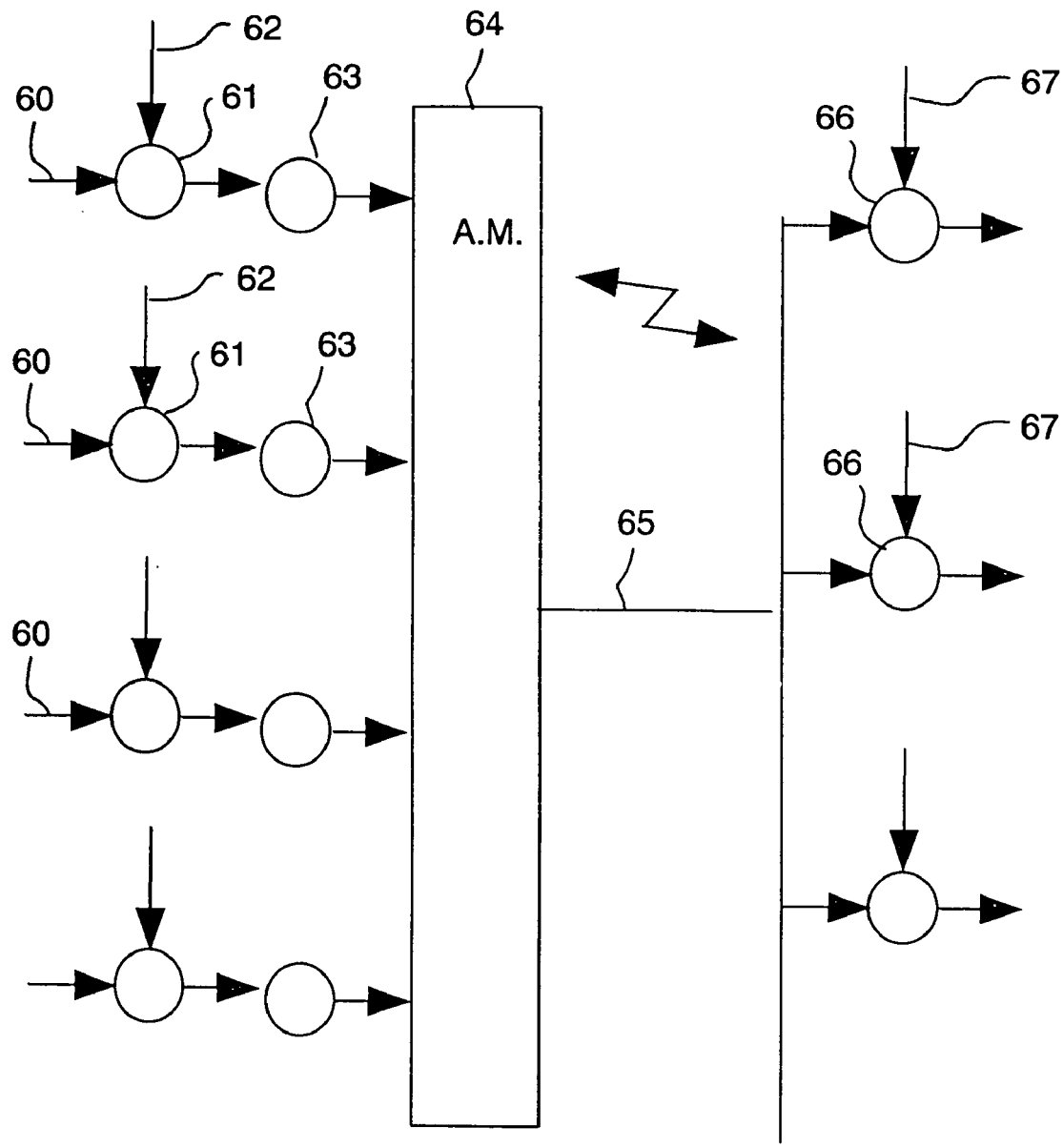
FIG. 11 details a CDMA system using Walsh codes (prior art).

FIG. 11 details a prior art CDMA system using Walsh codes. It includes a data/information input 60 and an encoder 61 in the transmit channel, with Walsh code 62 (encoding). There is a time delay 63 because of waves propagation, then adding means 64 that sum the various mobile users onto a common channel 65 (i.e. a wireless channel).

At the center unit, there is a decoder 66 in receiver, with Walsh code 67 (decoding).

There may be a different time delay in each channel, thus in reception the codes are no more orthogonal. The reduced separation between channels may result in interference and reduced performance.

At present, a problem in CDMA is how to generate orthogonal codes.

It is possible to have N channels using orthogonal Walsh codes to multiply each channel, wherein each user has a different Walsh code. In the downlink channel (DL), that is the channel from the base station to subscribers, the orthogonality is preserved, since transmission to all users is prepared and transmitted at the same time. Each user receives all the encoded messages at the same time.

In the uplink, however, each user has a different timing because of a different propagation time delay.

Thus, each Walsh code (corresponding to a specific user) may be shifted in time relative to the other codes (that correspond to the other users). This effect creates interference between channels.

The problem is further aggravated by multipath, that may cause the phase shift in each channel to change in time.

To preserve the separation between users in a CDMA communication system, it is necessary to preserve both the timing between the various transmissions and the frequency lock to each transmitter to achieve orthogonality between the various transmissions.

If either the timing or the frequency are not coordinated, this may result in interference between users and will result in a reduction in the communication system performance.

To preserve the separation between users in a CDMA communication system, an OFDM/CDMA system is disclosed. The system includes both carrier and timing correction means (implemented as AFC and ASC, respectively) to achieve improved performance.

This system is effective even in the uplink channel, where there may be a time difference between signals received from the various users.

This method and system achieve better performance with respect to prior art CDMA. CDMA is based on orthogonal codes being allocated to the various users. The codes, however, are orthogonal only if they are received at the same time. In prior art systems, the various signals may be received with different relative time delay, so they are no more orthogonal as intended.

In the novel system and method, using OFDM to achieve synchronous reception of the various signals, the CDMA codes are received concurrently. Thus, in the novel approach the various transmissions are synchronized. This achieves orthogonality between the various CDMA transmissions.

Thus, the above scheme may achieve improved performance relative to CDMA.

In our system using OFDM, all the information undergoes FFT, with Ts the symbol time.

Each user has a different carrier or group of carriers in the uplink. These carriers are preferably spread over the entire frequency band that is allocated for that channel, to achieve improved resistance to interference.

In the receiver—it is important to have a very precise carrier. It can be corrected with GPS, that transmits very precise synchronization signals, of a 1E-9 precision, to lock all the transmitters.

The GPS signals may be advantageously used in OFDM.

Another method uses means for locking the clock in the subscriber units to the base station.

For CDMA, the GPS solution is less desirable. GPS affects the chips, whereas in CDMA it is required to stabilize the carrier signal frequency.

To achieve orthogonality between the various users, it is necessary to control both the timing and the frequency of the various transmissions. Frequency control may be achieved with Automatic Frequency Control (AFC) means.

In one embodiment, each subscriber unit may lock its frequency to a reference signal received from the base station.

Time synchronization may be achieved with synchronization means in the mobile units or the base station or both may be used. These means may be used to align all the transmissions from the mobile units in time.

Figure 12:
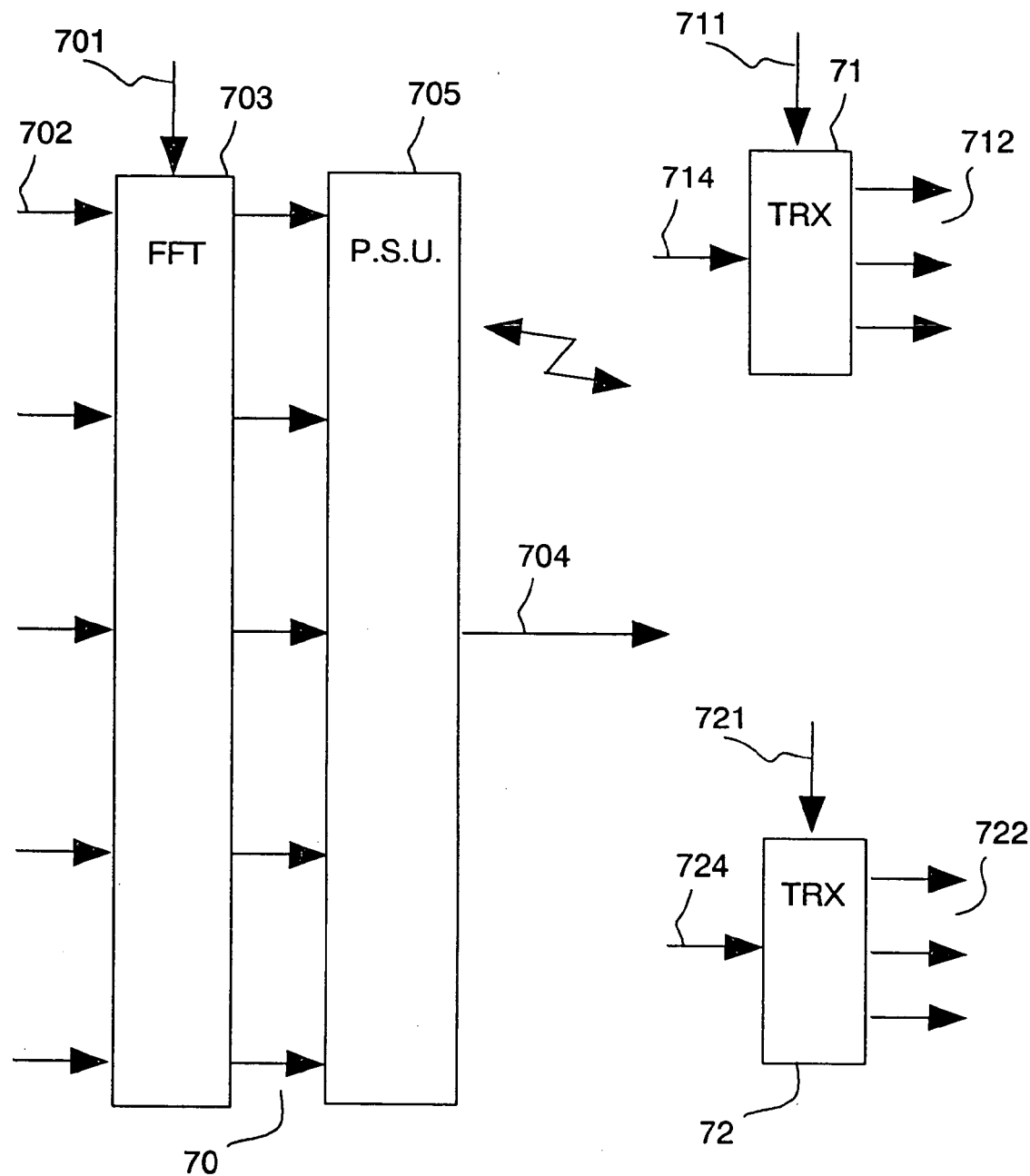
FIG. 12 details an OFDM with precise frequency setting in each unit.

FIG. 12 details an OFDM with precise frequency setting in each unit. The system includes a plurality of transceivers, as illustrated with several units 70, 71 and 72, each with its own AFC/GPS frequency reference 701, 711 and 721 respectively. A transmitter in unit 70 includes an IFFT processor 703 operating on a plurality of inputs 702, for all the other users 71, 72 . . . etc. Furthermore, a pulse shaper may be used to reduce the GI time.

Throughout the present invention, pulse shaping is meant to refer to a window being applied to a signal.

A parallel to serial P/S unit 705 transforms all the IFFT outputs to a serial stream of complex samples in output channel 704, to be transmitted over the channel 65.

Alternatively, each user will be locked to the base (AFC) and will transmit with the locked source at such a rate so as to achieve a relative lock that is within 1E-4 ppm for example.

Each unit 71, 72 has an input channel 714, 724 for receiving data, and processing means for processing the data to result in decoded outputs 712, 722 of units 71, 72 respectively.

Now all users are orthogonal to each other, since they use different frequencies. In reception, the frequency remains the same, however the phase may change because of the difference in time delay.

Preferably the receiver includes means for applying a window to the signals.

Each user is allocated a group of carriers (bins), according to a predefined frequency allocation ordered by the center. In reception, a specific time delay results in a rotation of each bin (carrier frequency). It is required to multiply each carrier by $\exp(-jKi)$ in order to arrange them again in phase. This may be implemented in a PLL or another loop that corrects the relative phase error. This multiplexing method is of type OFDM with frequency division multiple access. A TDMA scheme is detailed elsewhere in the present disclosure.

Further details on methods for the detection and correction of a phase difference are presented elsewhere in the present disclosure.

A combination TDMA/OFDM may be used to provide Bandwidth On Demand (BOD). As detailed with reference to FIG. 10, it is possible now to allocate a varying number of carriers to each user, according to the needs of that user. The base station may be used to coordinate the carriers allocation for each time segment to all the users in the communication system.

To illustrate the problem in prior art systems: In a TDMA implementation with a time interval of 5 msec, for example, and 500 slots, this would require a time slot of 10 microseconds. This is a very short time. A system using this scheme is prone to errors and interference.

In a TDMA/TDD system, there is a time of arrival difference between the various mobile users. There is a near-far difference.

In FDD, all can transmit and receive simultaneously. The system is less sensitive to a time difference between users.

A possible solution to the above problem is an OFDM/TDD system. For example, with a time interval of 5 msec, and using 50 OFDM channels with a total of 2000 carriers, each channel may be allocated 40 carriers. Now a longer time may be allocated per bit in each carrier, to achieve less sensitivity to interference and multipath.

Moreover, in the novel system the guard interval forms a shorter percentage of the time interval. That is, the guard interval is shorter relative to the symbol duration. This helps achieve a more efficient communication system, where less time is wasted for the guard interval.

Thus, an effective uplink channel may use CDMA with frequency lock. The uplink is the more difficult problem in a communication system, and the abovedetailed system and method may be advantageously used to improve the performance of the system.

For a FDD embodiment, the system should preferably use Automatic Synchronization Control ASC for improved performance. This answers the near/far problem.

The receiver includes pulse shaping (windowing) means for a further system performance improvement.

In TDD, special care should be paid to prevent interference between transmission and reception, that are in the same frequency range.

Pulse shaping (windowing) is required to separate the transmit and receive signals in time.

In FDD, however, since the transmit and receive are at different frequencies, the situation of simultaneous transmission and reception is less of a problem.

To address the above problem, the bit transmit rate is reduced. A plurality of codes is used to separate the various users. Moreover, the percentage of time lost in the guard time is reduced.

Figure 13:
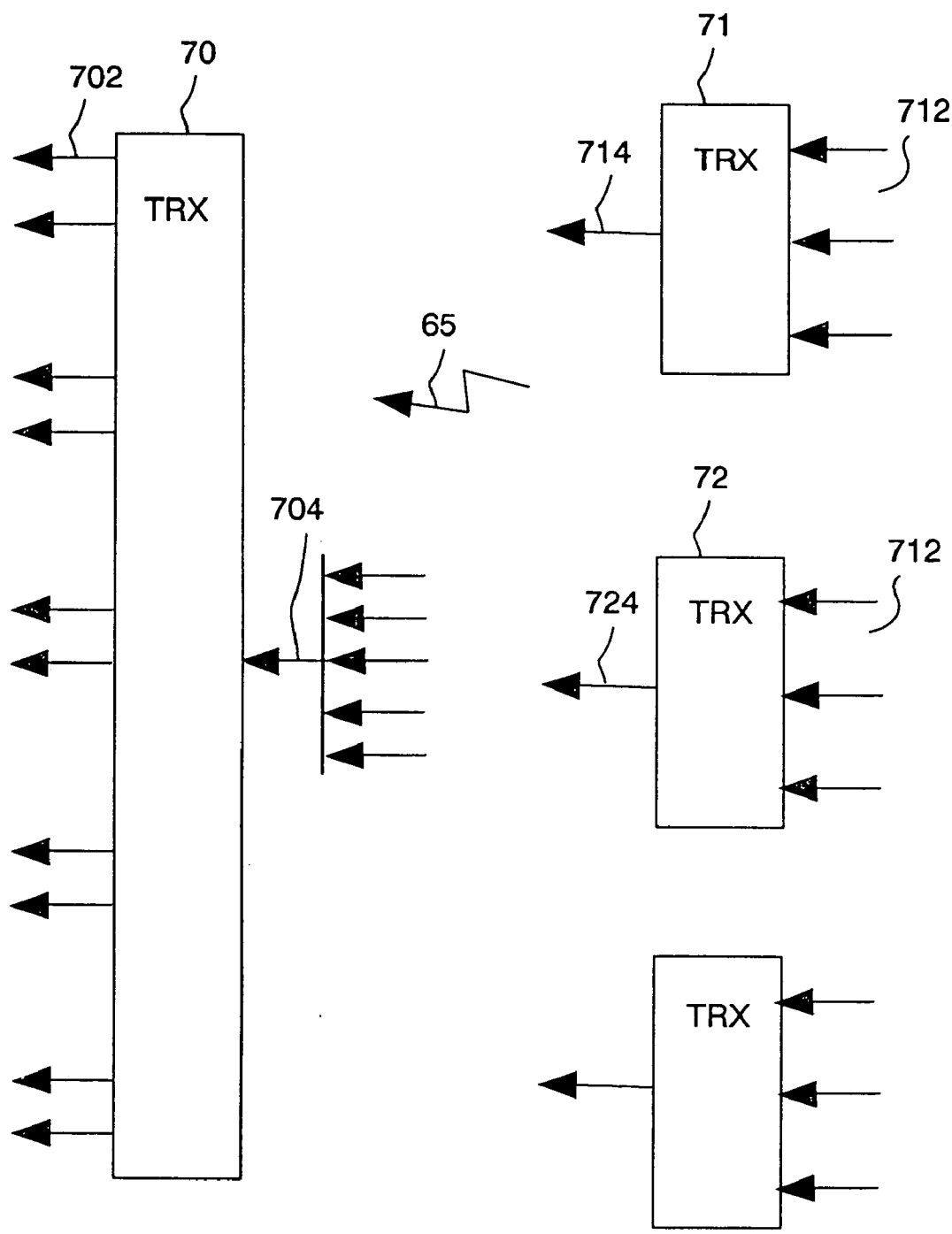
FIG. 13 details a CDMA implementation using OFDM for transmission from users to a center.

FIG. 13 details a CDMA implementation using OFDM for transmission from users to a center.

Each unit 71, 72 has a corresponding channel 712, 722 now used as input to receive local data, and processing means to encode it using IFFT to result in encoded outputs 714, 724 of units 71, 72 respectively.

All these signals are transmitted over the common channel 65. The combined signals are received in center unit 70 through channel 704 and are decoded in a common FFT, performed on all the received signals. The result is the outputs for all the transmitting units, at outputs 702. A common FFT may be now applied to all the users together.

Additionally, a closed loop may be applied for each user to correct the difference in time of arrival of the signal from that user.

The common FFT is applied after all the users are more or less aligned in time. If there is a time difference resulting from a user not being perfectly aligned, then, even if part of the signal therein may be lost in the frequency domain, the actual information in the time domain may be less affected. The actual data may be affected in two ways:

1) Rotation between bins

2) A reduction in the signal amplitude

Figure 14:
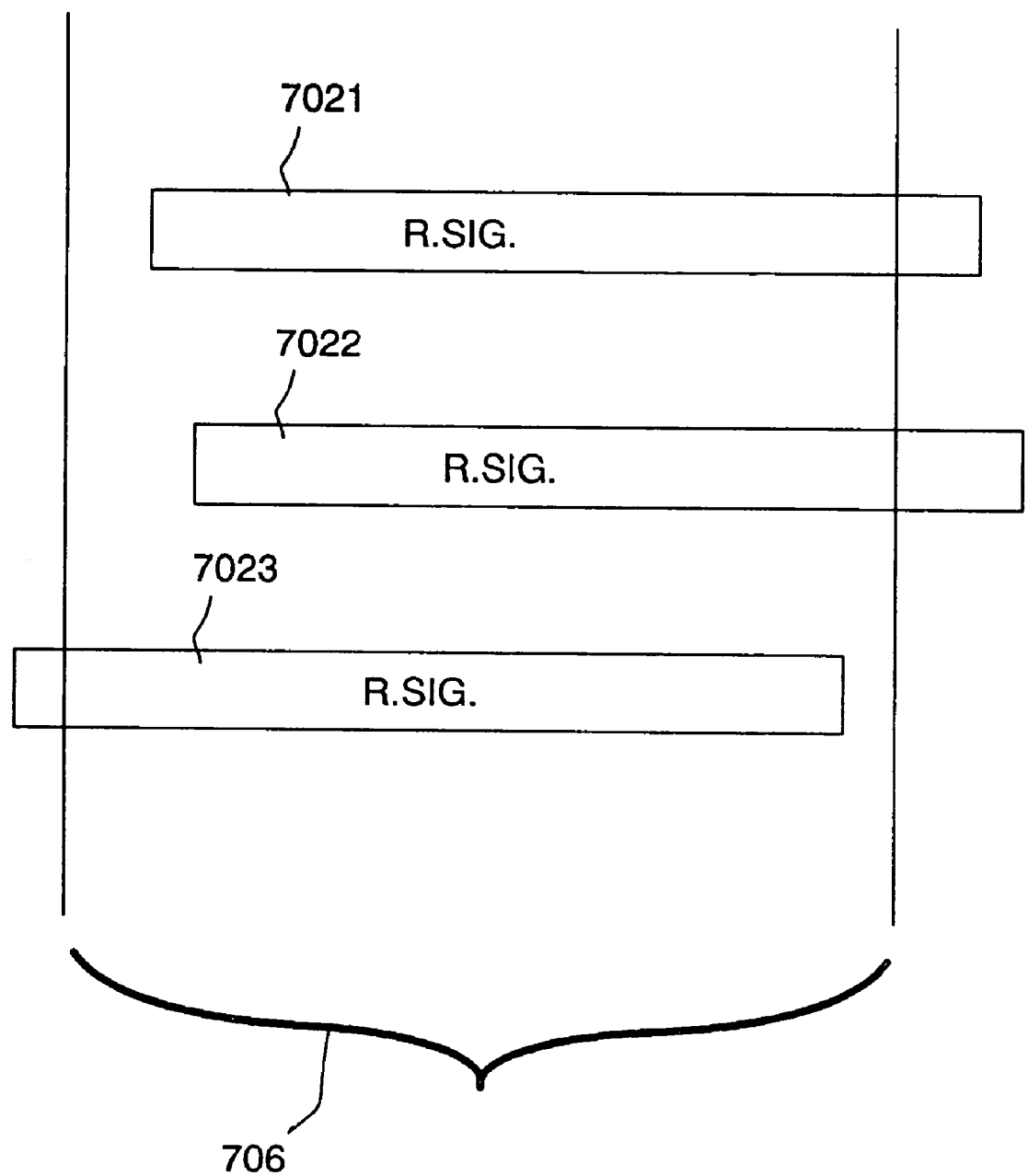
FIG. 14 details the correction in time and frequency in the new system.

FIG. 14 details the correction in time and frequency in the new system. Signals received in center unit 70 may have a time difference, as illustrated with signals 7021, 7022 and 7023 pertaining to units 71, 72 etc.

As the FFT is performed over a common time period 706, part of the information in various channels may be lost. A correction in time is thus required, that may be performed with a loop in time.

At the base station, a common FFT signal processing is performed on all the received signals from the mobile units. This simplifies the signal processing. It requires, however, that the received signals be received within about the same frequency period and with a minimal frequency deviation. A difference in timing would result in a phase difference in the FFT.

An illustrative embodiment of a possible solution according to the present invention includes means in the center 70 for ordering each user unit 71, 72 etc. to correct its transmission timing relative to the center, taking into account the time delay measured in unit 70.

For example, if unit 72 is received at a delay delta_T after unit 71, unit 71 may be ordered to transmit at a delay delta_T as well. Then units 71 and 72 will be received concurrently in unit 70.

Similarly, where more units are received, they all may be ordered to insert each a specific delay so as to bring them all in line, that is to receive all the messages during the same time interval 706. If possible, each unit may be ordered to transmit earlier. For example using a PLL to keep time of the transmit interval and to start transmission earlier, by a specific time difference so as to correct differences in time of arrival to the center 70.

It is possible to measure the distance to each user, and to compute the time delay to that user accordingly. From the distances to all users it is possible to compute a time delay correction, that is to be applied to signals received from each user. This will bring all the transmissions from the various users to be in time. Alternately, the center station may order each user to transmit at a specified time delay that will compensate for the variations in distance, so that all the messages, from the various users, will be received in time.

Using a closed loop control, the base may shift the user response forward or backward, until it is received at the center location in time with all the other uplink users. That is, all the users in the uplink channel will be received during the same time window.

A separate control loop may be used with each mobile user. Moreover, all the individual loops may be coordinated to be within physically feasible limits, so that the time of transmission of all the loops are coordinated from the base station.

To implement the above method, Automatic Synchronization Control (ASC) signals may be sent from a controller 36 (see FIG. 8) in the base station to the mobile subscribers. These signals are used to bring all the subscriber units in synchronization with the base station.

The distance to each user may be measured using methods known in the art, for example by measuring the time for a signal to propagate to a user and back, and knowing the velocity of propagation of electromagnetic waves and the expected time delay in a user's unit.

Each user signal may also have a frequency shift. An automatic frequency correction AFC means may be used to correct the received frequency.

A correction in frequency is required, so that the various carriers appear in the FFT in their correct location.

This is implemented with an automatic frequency correction AFC loop.

To achieve this correction, each mobile user includes means for achieving a frequency lock to base station (a lock in the frequency domain).

As illustrated in FIG. 8, controller 36 may generate Automatic Frequency Control (AFC) data, which is sent from the base station to each subscriber unit to achieve nearly orthogonality between subscriber units transmitting to the same base station.

Thus, transmissions from each user undergo corrections in time of arrival and frequency, to bring them to a common window. These signals are then added into a common channel and a FFT signal processing is performed on the received signal.

Figure 15:
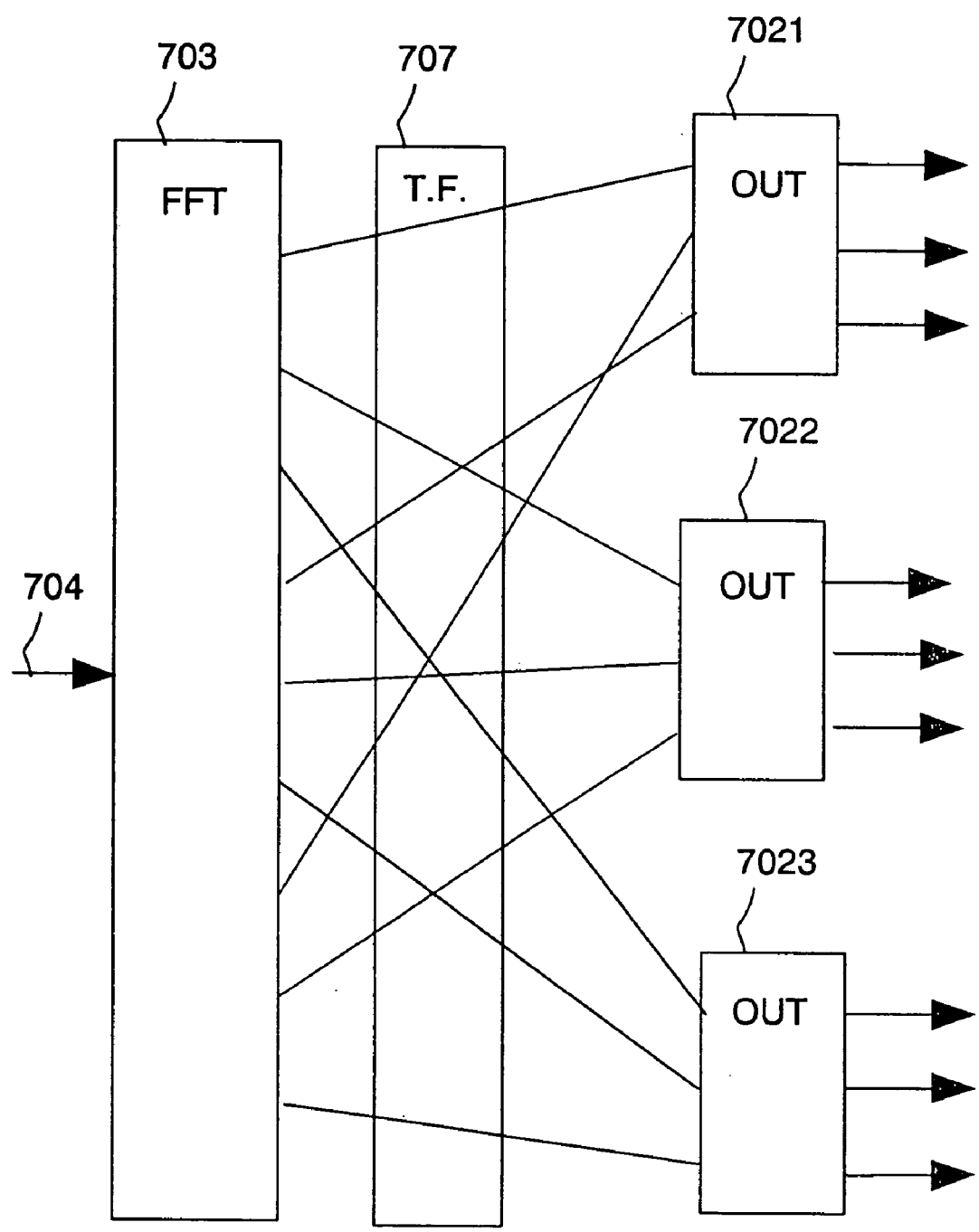
FIG. 15 details an implementation of the CDMA decoding using FFT.

FIG. 15 details an implementation of the CDMA decoding using FFT. The signal processing includes an FFT processor 703 operating on an input channel 704 and a transversal filter means 707 that reduces the pulse widening because of the window in transmitter.

In the transmitter, a window in time has been applied to each pulse to decrease harmonics, to decrease the guard time and to decrease the multipath effects.

This applied window, however, has the undesired effect of creating a pulse with sidelobes. These sidelobes are reduced in filter 707 to result in a plurality of outputs 7021, 7022 and 7023 from all the other users 71, 72 . . . etc.

In the transmitter, transmit pulses are shaped in time to achieve a limited bandwidth, to prevent interference between adjacent channels pertaining to different modulated carriers, to decrease the guard time and to decrease the multipath effects.

In the receiver, an equalizer is used to remove or attenuate the sidelobes in the vicinity of each carrier, to restore the original carriers in the transmitter.

Anyway, each carrier may have a different phase, because of rotation in phase resulting from the propagation time delay and the different wavelength of each carrier.

Figure 16:
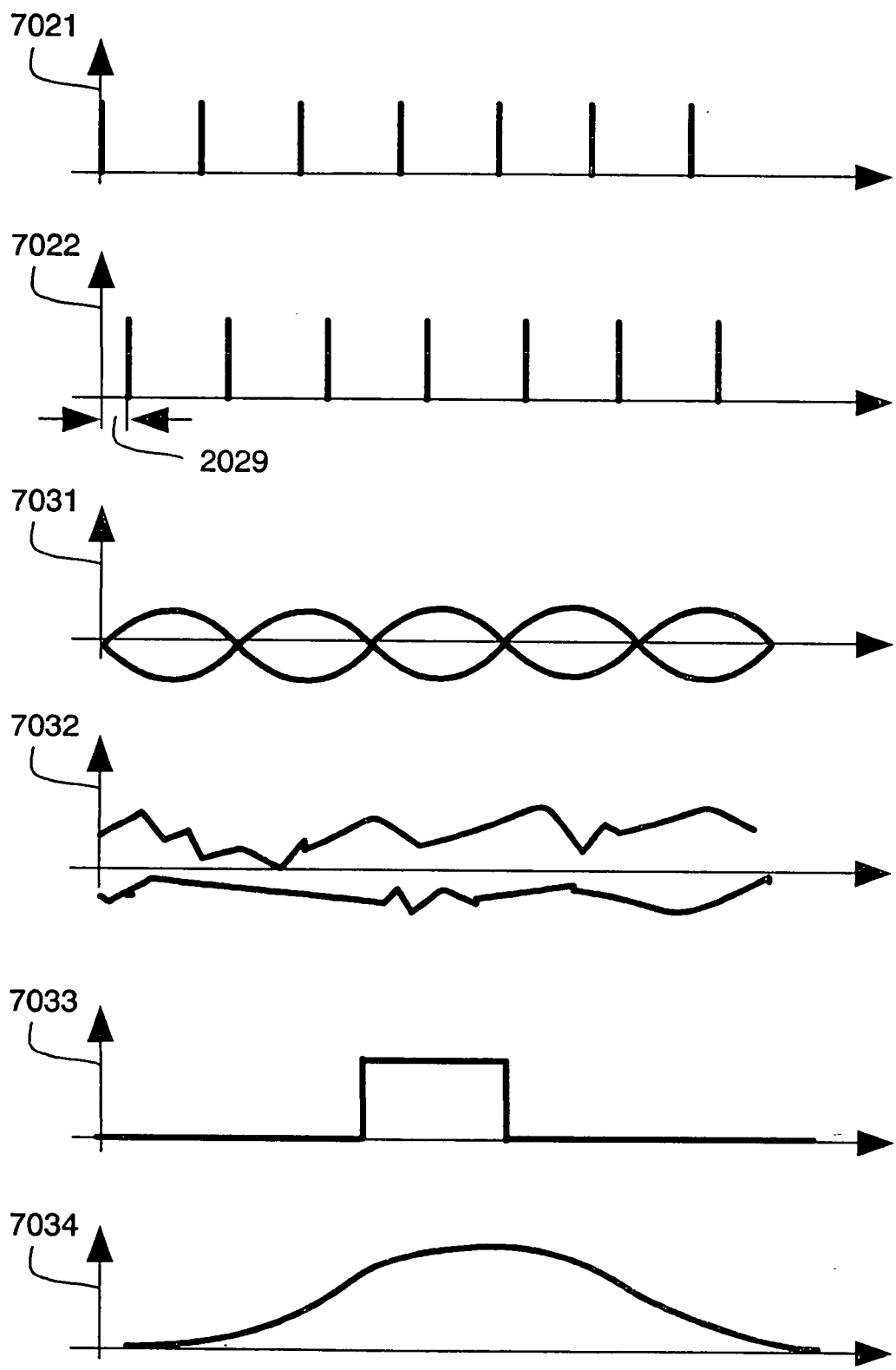
FIG. 16 illustrates a processing performed on received signal, with the application of a window in the time domain.

FIG. 16 illustrates a processing performed on received signal, with the application of a window in the time domain.

The signals 7021, 7022 from two mobile units 71 and 72, respectively are illustrated in the frequency domain (amplitude of each carrier).

It will be recognized that each of these signals comprises a pulse train in the frequency domain, with pulses with an equal spacing therebetween. There is an equal spacing in the carriers for signals 7021 and 7022, as well as the other signals from other mobile units.

In one implementation, each pulse train is shifted in frequency a fixed increment delta_F 2029 from the previous one. Thus, each user operates over an individual set of frequencies. For example, a channel may include 512 carriers, to be divided among 8 users, with each user having 64 carriers. In the time domain, the signal 7031 representing the sum of these carriers may result in 8 lobes over one time interval, as illustrated.

The signal 7032 representing the sum of these carriers may not result in 8 lobes over one time interval, because of the frequency shift in each carrier.

It may be possible to create signals with repeating lobes like those corresponding to signal 7031, by rotating each of its carriers a specific phase. This may achieve the signal shaping as desired.

As a signal like 7031 has several lobes in the time domain, it is possible to apply a window in the time domain so as to use only one lobe or only part of the available lobes. For example, a square window 7033 may be applied. Controller means (not shown) in the receiver may be used to synchronize the timing of window 7033, so as to precisely correspond to one lobe or to two or more lobes. Alternately, a gradual window 7034 may be used. There are less stringent requirements regarding synchronization for this type of window.

In another embodiment, each user may be allocated a group of carriers. Preferably, the carriers assigned to each user are not adjacent but are rather dispersed among the whole bandwidth assigned to the communication channel. This may help reduce the disruptive effect of a local interference in the channel.

A common FFT will be performed on all the received signals, with all the carriers corresponding to all the active users.

A time delay will appear as a phase shift in these carriers, with a progressively increasing phase because of their different frequencies.

This is like a progressive rotation of the phasors representing the carriers group for each user. As each user may have a different time delay, a different parameter of phase rotation should be applied for each user.

The signal processing may try several values of phase increment, corresponding to several time delays, until a good fit is achieved. A good fit is that which will cancel the relative phasors rotation for that specific user.

The above time delay problem may be corrected, as detailed in FIG. 8, using Automatic Synchronization Control (ASC) signals sent from controller 36 in the base station are used to bring all the subscriber units in synchronization with the base station.

Separation Among Users in the Common Receiver

Each user is allocated a different group of frequencies in the OFDM channel. For example, assuming 512 carriers and 8 users with an equal bandwidth allocated to each user, each user will be allocated 64 carriers. Let's assume the carriers are indicated as F1, F2, . . . F512 The first user will be allocated the frequencies F1, F9, F17 etc. These frequencies will result, in the time domain, in eight beats or lobes of identical shape.

There may be a synchronization problem, wherein the transmitted shape for each user repeats itself 8 times in the message. Since these lobes are identical, there is no need to transmit them all. It is possible to synchronize on one or several of these lobes, and to transmit only part of the time.

For the second user, that will be allocated the frequencies F2, F10, F18 etc., the sum of these signals may not result in beats as above detailed.

It may be possible to apply signal processing, to shift the phases of the various carriers prior to summing, to again achieve the beats in the time domain, that allow a user to transmit only part of the generated signal.

In a preferred embodiment, each user is allocated a set of frequencies that are not adjacent, as illustrated in the above example.

Whatever is the allocation of carriers to users, a common FFT is implemented and the users are separated at the output of the FFT, according to the carriers that were allocated to each user.

Thus, the above scheme may achieve improved performance relative to CDMA: whereas in CDMA all the received messages have to be synchronized down to a chip time interval, in the above OFDM method a relaxed requirement is that the received signals be synchronized only to a bin level.

Moreover, according to the present invention, a combination of carrier allocation and time division multiplex may be used to separate among users in the system.

Figure 17:
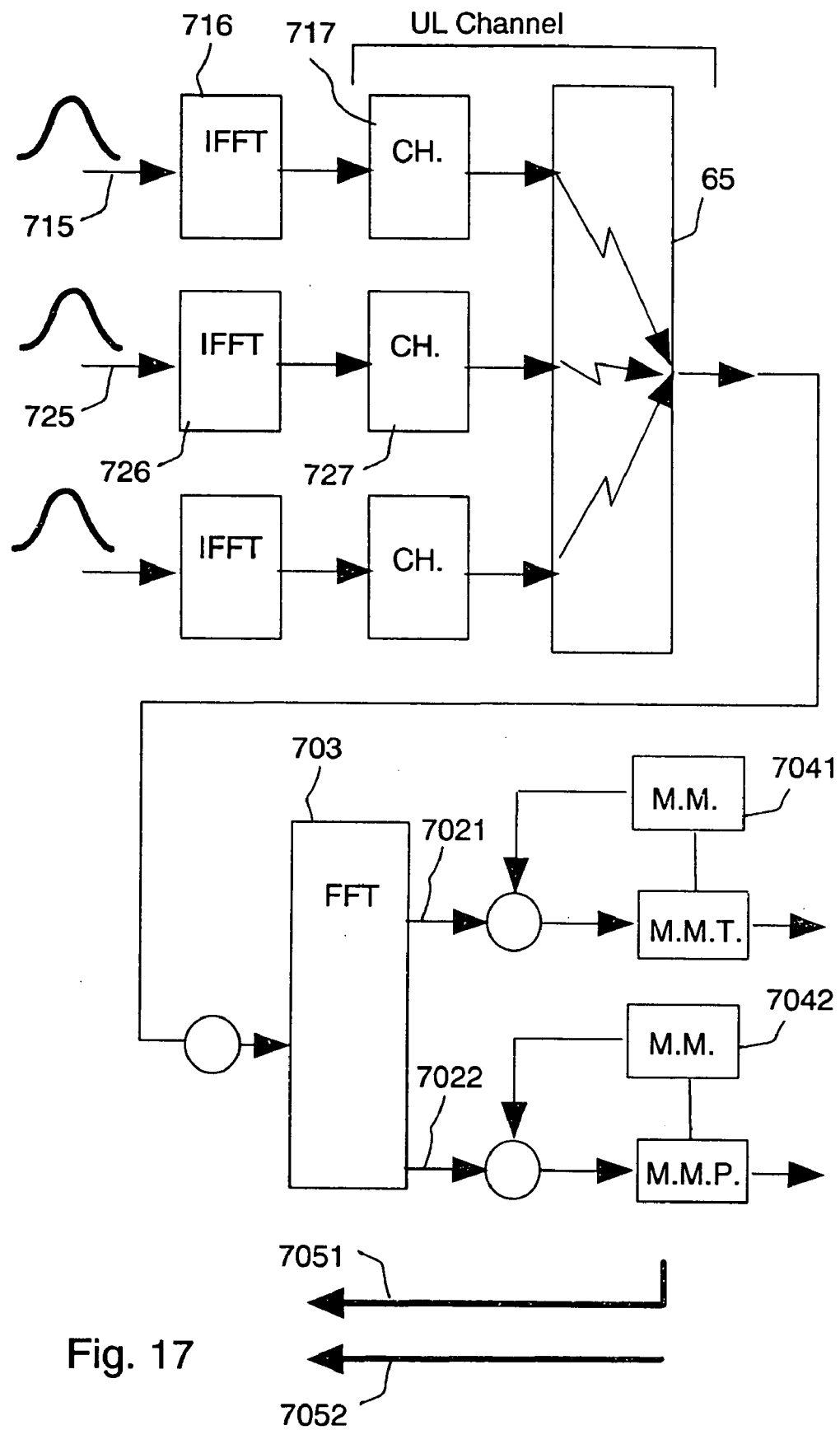
FIG. 17 details a multi-user system with signal processing in the time and frequency domains.

FIG. 17 details a multi-user system with signal processing in the time and frequency domains.

The signal 715 from a user has a window applied thereto in the time domain, prior to a FFT signal processing 716. The signal is transmitted over a common channel 65 to a central station.

Because of the different distance to each user, there is a specific time delay 717 associated with that user.

Similarly, a second user will have a signal 725 with a window applied thereto in the time domain, prior to a FFT signal processing 726. The signal is transmitted over a common channel 65 to a central station. This user will have a time delay 727.

In the central unit, the received signal is transferred to a FFT processor 703, that outputs a plurality of outputs 7021, 7022 . . . pertaining to the various mobile users.

Measuring means 7041, 7042 . . . measure the time deviation and phase deviation in the link with each mobile user. Accordingly, correction commands 7051, 7052 . . . are sent to each user unit. Thus, each mobile unit can correct its transmission so as to align its timing and phase to the other mobile units, up to one bin.

In prior art CDMA, alignment up to one chip was required to maintain orthogonality between signals. In the new system, less stringent requirements are to be met (synchronization only to one bin) because of the separation in frequency between users.

Thus, a lower inter-symbol interference ISI may be achieved.

The results of the FFT are dependent on the time difference between users.

In the above embodiment, the channel bandwidth was equally divided among the users, with each user being allocated an equal number of carriers.

In another embodiment, each user may be allocated a different number of carriers. The allocation may be made at the center, that transmits commands to each user unit to coordinate the use of carriers in each mobile user unit at any given time.

Thus an adaptive bandwidth is achieved for each user, with an adaptive spread.

In any case, the system achieves good use of the frequency spectrum, with effective bandwidth allocation to the various users at any given time.

Figure 18:
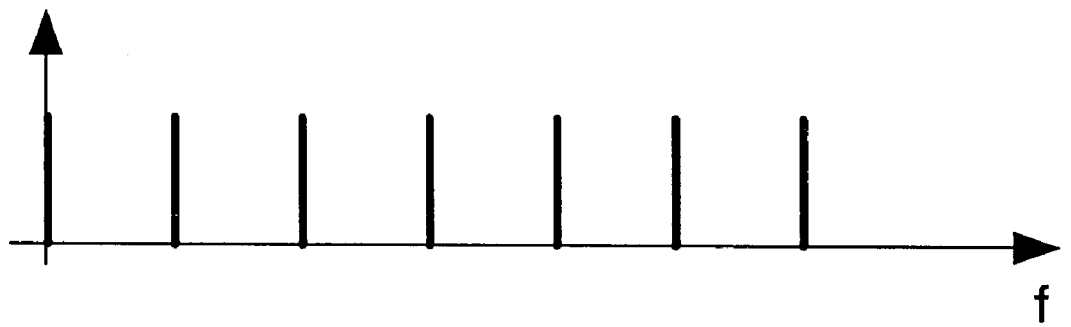
FIG. 18 details the signals in a multi-user system with Walsh coding over OFDM.
Figure 18:
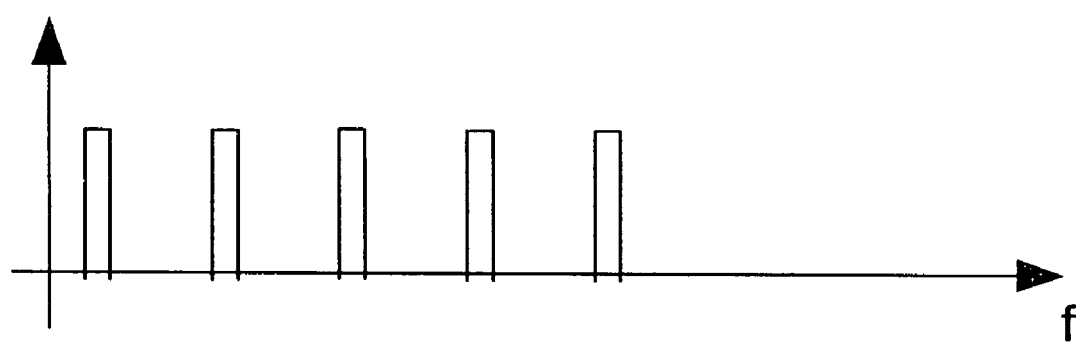

FIG. 18 details the signals in a multi-user system with Walsh coding over OFDM. Signal processing for transmission from a mobile unit is illustrated. The signals are spread in frequency.

The invention will now be illustrated with a specific embodiment, referring to a 512 point FFT with a 16 k resolution, wherein a 8 MHz bandwidth is required.

A system with 128 carriers per user may be implemented, each with a 64 k rate. The timing for performing each FFT is 1/16 k=62.5 microsecond. The system will generate 16 symbols each 1 millisecond.

The system further uses a 16 slot TDMA.

For each user, the system will implement FFT and a different Walsh code.

Figure 19:
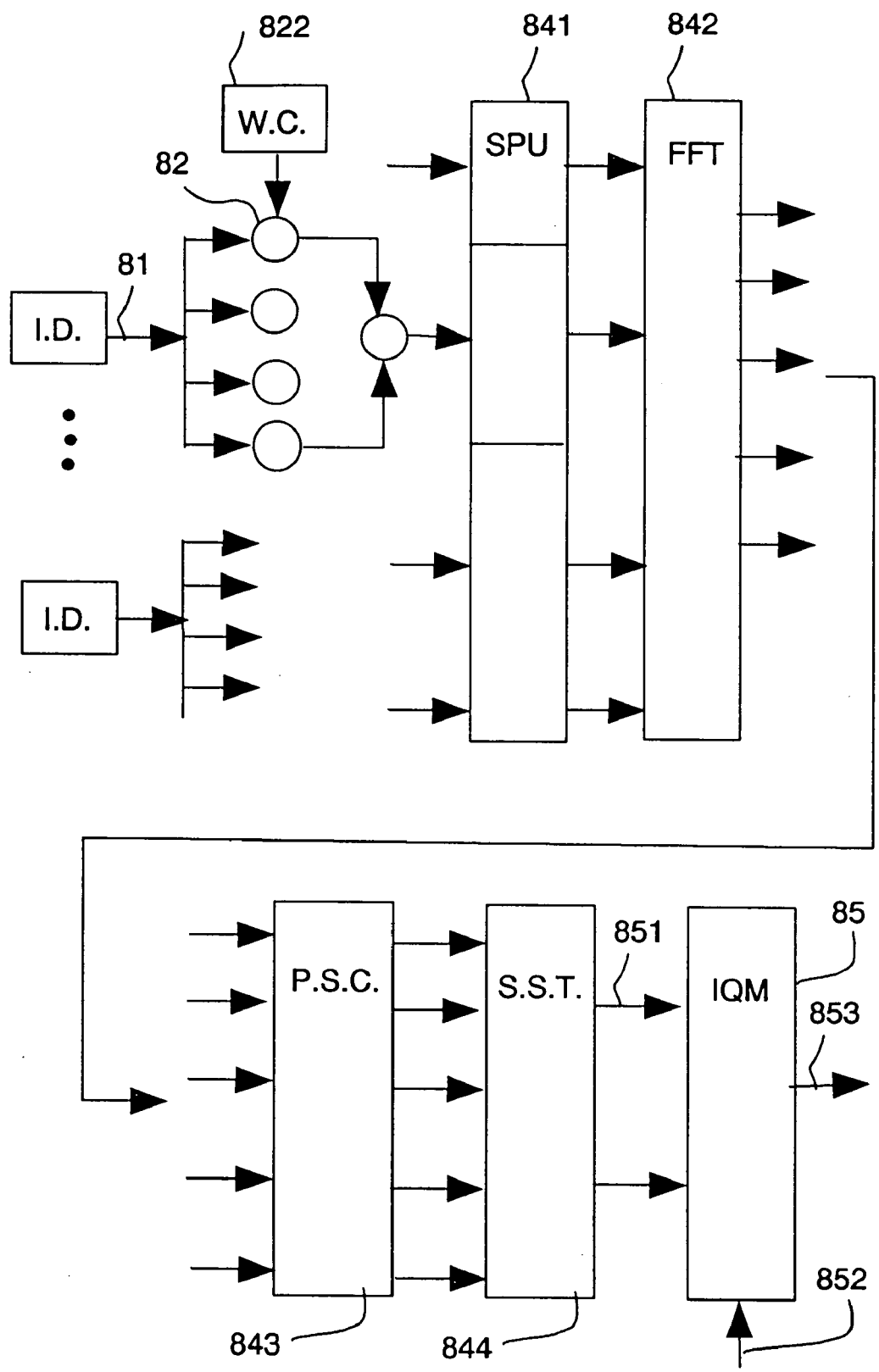
FIG. 19 details a functional block diagram of the signal processing in a mobile transmitter.

FIG. 19 details a functional block diagram of the signal processing in a mobile transmitter, to generate the above signals.

In this implementation, input data to be transmitted 81 is entered serially and is encoded with Walsh code 822 in modulator unit 82.

Each user is assigned a specific number of carriers.

This system implements a CDMA/OFDM scheme.

To separate among users, each user may be assigned a different Walsh code. In this case, a plurality of users may share a common frequency band. Alternately, several users may be assigned the same Walsh code, however each operates in a different frequency band.

Various combinations of the above scheme may be used to achieve an efficient separation between users, with the resources of the channel being dynamically allocated as required.

Bandwidth on demand and channel summing is performed in unit 83. Serial to parallel unit 841 converts the data to parallel words that are processed in FFT unit 842. Further signal processing includes parallel to serial P/S conversion in unit 843 and signal shaping in time unit 844. The serial channel 851 is input to an IQ modulator unit 85, where it modulates a LO input 852, to generate the modulated IF/RF signal 853.

In the example as illustrated, two lines are used to implement a QPSK modulation.

Various modulation schemes may be implemented, for example BPSK, QPSK or a multiphase method.

A similar signal processing will be implemented in the transmitter of the central station.

Figure 20:
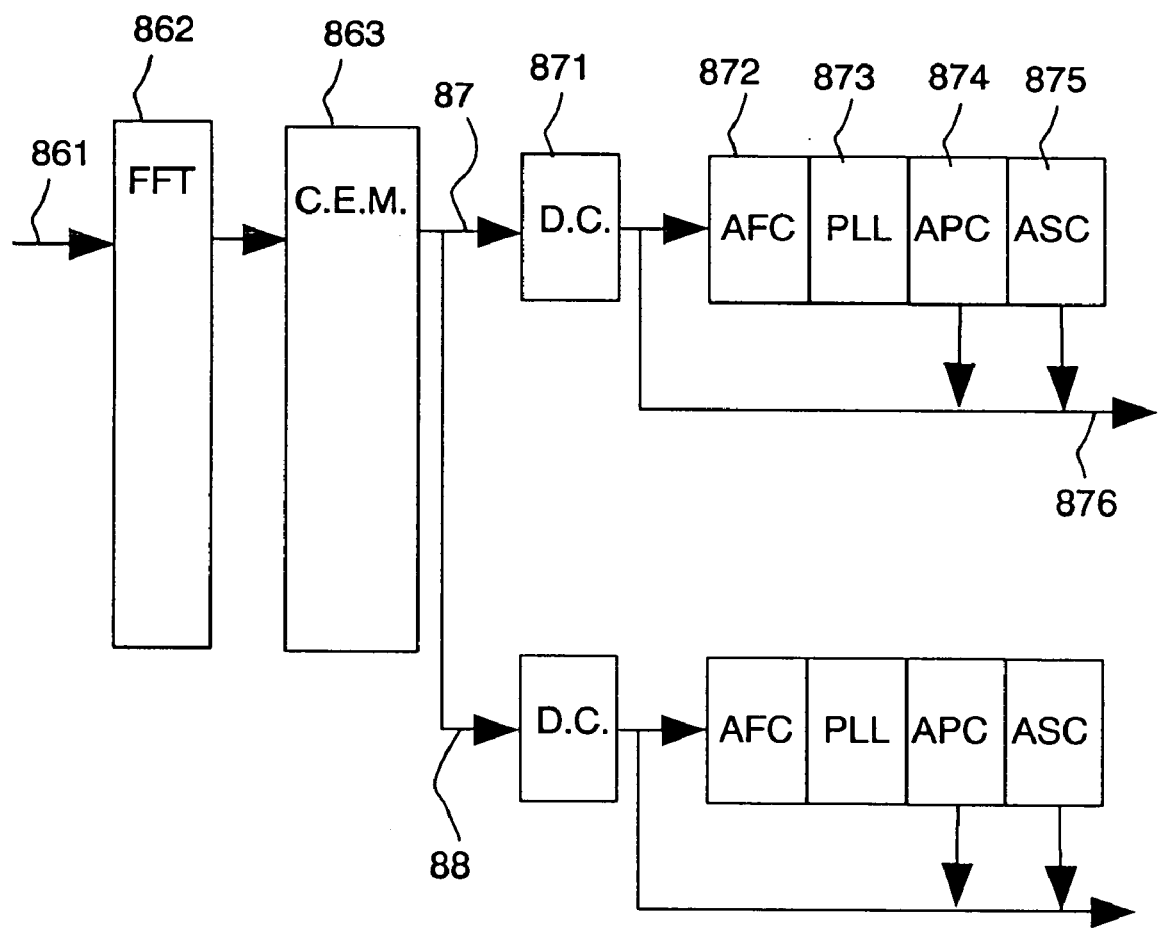
FIG. 20 details a functional block diagram of the signal processing in a central station receiver.

FIG. 20 details a functional block diagram of the signal processing in a central station receiver.

The serial input signal is converted to a parallel signal in a S/P unit (not shown), to generate input channel 861.

A FFT unit 862 is used, followed with pulse shaping (windowing) in chip equalizer means 863. The signal is then separated into channels corresponding to the various users, as illustrated with channels 87 and 88 for the first two users.

Data channel 87 is output as user 71 data out channel 871. Additionally, data channel 87 is analyzed so as to correct for the various possible deviations, this including the automatic frequency control AFC 872, the phase lock loop PLL 873, the automatic power control APC 874 and the automatic synchronization control ASC 875.

Thus, the base station includes means for coordinating the operation of the subscriber units, including ASC, APC and AFC. Automatic Synchronization Control (ASC) means 875 sends signals from the base station, that are used to bring all the subscriber units in synchronization with the base station, thus maximizing the transmission time and preventing transmission overlap between subscriber units and the base station.

Automatic Power Control (APC) means 874 sends signals from the base station to each subscriber unit, that are used to control the transmit power of each subscriber unit so that signals received at the base station from the various users have about the same power. This achieves more efficient processing at the base station and helps minimize ISI to nearer subscribers.

Automatic Frequency Control Implementation

Throughout the present disclosure, it is to be understood that there are various possible embodiments for the Automatic Frequency Control (AFC).

Examples of AFC Embodiments:

1. AFC means 872 sends data from the base station to each subscriber unit, to control its frequency so as to achieve nearly orthogonality between subscriber units transmitting to the same base station.

As the base station AFC means 872 detects deviations in the frequency of a mobile unit, it sends correction signals to the mobile unit. The mobile unit corrects its transmit frequency accordingly, so as to be received at the required frequency in the base station. The base station corrects the individual frequency deviation in each mobile unit.

2. A preferred embodiment of AFC is achieved with means in the mobile unit for correcting for frequency deviations. The mobile system implements the following method:

A. A signal is received from the base station and is used to achieve a frequency-lock or phase lock to the base station. The mobile unit may lock on a pilot signal from the base station.

Frequency lock may be achieved, for example, using phase lock loop PLL means. In any case, a signal is generated at the received frequency or at a frequency related thereto.

B. The frequency of the signal thus generated is used to generate the subscriber transmit frequency and clocks. Thus, the transmit frequency is responsive to the frequency of the received signals from the base station.

Thus, the frequency deviations of the various mobile units will be corrected or greatly reduced. This may compensate for frequency deviations resulting from Doppler for example.

As the signals from the various mobile stations are received at the base station at their correct frequency, the orthogonality between users is preserved and a higher performance system is achieved.

This is achieved despite possible frequency deviations because of Doppler shift, multipath and the like.

Moreover, signals received from a plurality of mobile units can be processed together in an FFT processor at the base station, with the knowledge that each unit has no frequency deviation or has just a small deviation from its assigned value.

To implement the above method, a mobile unit includes:

A. means for measuring the frequency of signals received from the base station. These means may include, for example, means for achieving frequency-lock or phase lock to signals received from the base station. The mobile unit may lock on a pilot signal or to another transmission from the base.

Frequency lock may be achieved, for example, using a phase lock loop PLL. The PLL may measure the phase difference between the VCO output and the received pilot signal. The phase error is applied to the VCO to correct its frequency.

In any case, a signal is generated at the received frequency or at a frequency related thereto.

B. Means for generating a transmit frequency that is derived from the signals received from the base station in means (A) above.

The transmit frequency may be generated by multiplying the received frequency by a constant value.

C. Transmit means for transmitting to the base station at the desired corrected frequency, that takes into account the frequency deviation in the communication channel.

3. Each mobile unit receives a third, fixed frequency signal and uses this signal to generate the transmit frequency and internal clocks.

What is claimed is:

1. In a unidirectional or broadcasting communication system using OFDM transmission from a base station to subscriber units, means for achieving a bi-directional channel comprising:
   A. transmitting means in the subscriber units for transmitting signals that are orthogonal to signals transmitted from the base station and are also orthogonal to signals from other subscriber units;
   B. receiving means in the base station for receiving and processing together signals from a plurality of subscriber units;
   C. Automatic Frequency Control (AFC) means at the base station for detecting deviations in a frequency of the signals transmitted from each subscriber unit and for sending correction signals indicative of the deviations, to each subscriber unit;
   D. control means in each subscriber unit for correcting the transmit frequency responsive to the correction signals received from the base, so that the signals received at the base from each subscriber have a frequency corrected for that deviation, wherein said base station further includes means for transmitting Automatic Synchronization Control (ASC) signals to each subscriber, for correcting deviations in a transmit time of each subscriber, and wherein each subscriber further includes means for adjusting the transmit time therein responsive to said ASC signals, so that all the subscribers in an uplink channel will be received at the base during a same time window.

2. In a unidirectional or broadcasting communication system using OFDM transmission from a base station to subscriber units, means for achieving a bi-directional channel comprising:
   A. transmitting means in the subscriber units for transmitting signals that are orthogonal to signals transmitted from the base station and are also orthogonal to signals from other subscriber units;
   B. receiving means in the base station for receiving and processing together signals from a plurality of subscriber units;
   C. Automatic Frequency Control (AFC) means at the base station for detecting deviations in a frequency of the signals transmitted from each subscriber unit and for sending correction signals indicative of the deviations, to each subscriber unit;
   D. control means in each subscriber unit for correcting the transmit frequency responsive to the correction signals received from the base, so that the signals received at the base from each subscriber have a frequency corrected for that deviation, wherein synchronization signals transmitted from the subscriber units further include a combination of CDMA modulation codes and OFDM coding/decoding means to achieve orthogonality between signals from various users in an uplink.

3. The means for achieving a bi-directional channel according to claim 2, wherein the CDMA modulation codes comprise orthogonal Walsh codes, wherein subscribers operate in a same frequency band.

4. In a unidirectional or broadcasting communication system using OFDM transmission from a base station to subscriber units, means for achieving a bi-directional channel comprising:
   A. transmitting means in the subscriber units for a transmission of signals that are orthogonal to the signals transmitted from the base station and are also orthogonal to signals from other subscriber units;
   B. receiving means in the base station for reception of said orthogonal signals;
   C. OFDM decoding means in the base station comprising an FFT processor operating on an input channel and a transversal filter means that reduces a pulse widening because of a gap interval in the transmitter,
wherein said base station further includes means for transmitting Automatic Synchronization Control (ASC) signals to the subscribers, for correcting deviations in a transmit time of each subscriber, so that all the subscribers in an uplink channel will be received at the base during a same time window.

5. In a unidirectional or broadcasting communication system using OFDM transmission from a base station to subscriber units, means for achieving a bi-directional channel comprising:
   A. transmitting means in the subscriber units for a transmission of signals that are orthogonal to the signals transmitted from the base station and are also orthogonal to signals from other subscriber units;
   B. receiving means in the base station for reception of said orthogonal signals;
   C. OFDM decoding means in the base station comprising an FFT processor operating on an input channel and a transversal filter means that reduces a pulse widening because of a gap interval in the transmitter, wherein
synchronization signals transmitted from the subscriber units further include a combination of CDMA modulation codes and OFDM coding/decoding means to achieve orthogonality between signals from various users in an uplink.

6. The means for achieving a bi-directional channel according to claim 5, wherein the CDMA modulation codes comprise orthogonal Walsh codes, wherein subscribers operate in a same frequency band.

* * * * *